(12) United States Patent
Ikuno et al.

(10) Patent No.: US 12,489,704 B2
(45) Date of Patent: Dec. 2, 2025

(54) USING OR APPLYING USER EQUIPMENT ROUTE SELECTION POLICY INFORMATION WHEN OPERATING A USER EQUIPMENT CONNECTED TO A TELECOMMUNICATIONS NETWORK

(71) Applicant: Deutsche Telekom AG, Bonn (DE)

(72) Inventors: Josep Colom Ikuno, Korneuburg (AT); Reinhard Lauster, St. Poelten (AT)

(73) Assignee: DEUTSCHE TELEKOM AG, Bonn (DE)

( * ) Notice: Subject to any disclaimer, the term of this patent is extended or adjusted under 35 U.S.C. 154(b) by 0 days.

(21) Appl. No.: 18/842,055

(22) PCT Filed: Mar. 16, 2023

(86) PCT No.: PCT/EP2023/056736
§ 371 (c)(1),
(2) Date: Aug. 28, 2024

(87) PCT Pub. No.: WO2023/180163
PCT Pub. Date: Sep. 28, 2023

(65) Prior Publication Data
US 2025/0112858 A1 Apr. 3, 2025

(30) Foreign Application Priority Data

Mar. 25, 2022 (EP) ..................................... 22164347

(51) Int. Cl.
*H04L 45/302* (2022.01)
*H04L 41/0894* (2022.01)

(52) U.S. Cl.
CPC ........ *H04L 45/308* (2013.01); *H04L 41/0894* (2022.05)

(58) Field of Classification Search
None
See application file for complete search history.

(56) References Cited

U.S. PATENT DOCUMENTS

2017/0289046 A1* 10/2017 Faccin ............. H04W 28/0268
2019/0394279 A1* 12/2019 Dao ...................... H04W 48/04
(Continued)

FOREIGN PATENT DOCUMENTS

CN 112399520 A 2/2021
CN 113395680 A 9/2021
(Continued)

*Primary Examiner* — Anh Vu H Ly
(74) *Attorney, Agent, or Firm* — LEYDIG, VOIT & MAYER, LTD.

(57) ABSTRACT

A method for applying user equipment route selection policy information when operating a user equipment connected to a telecommunications network includes: in a first step, a considered data packet is received by a user equipment route selection policy functionality; and in a second step and based on the content of at least one modification and/or handling indication, one or more of the following actions is performed by the user equipment route selection policy functionality: the considered data packet is treated such as to be buffered, the considered data packet is modified and treated such as to be assigned to a specific protocol data unit session of the user equipment, a notification is transmitted, by the user equipment, to the core network of the telecommunications network, or the user equipment route selection policy information is modified.

18 Claims, 3 Drawing Sheets

(56) References Cited

U.S. PATENT DOCUMENTS

| | | | |
|---|---|---|---|
| 2020/0259904 A1 | 8/2020 | Dao et al. | |
| 2021/0045033 A1 | 2/2021 | Sun et al. | |
| 2021/0051562 A1 | 2/2021 | Huang-Fu et al. | |
| 2021/0219357 A1 | 7/2021 | Talebi Fard et al. | |
| 2021/0258868 A1 | 8/2021 | Wong et al. | |
| 2021/0289400 A1 | 9/2021 | Matolia et al. | |
| 2022/0095154 A1 | 3/2022 | Qiao et al. | |
| 2022/0210698 A1 | 6/2022 | Ly et al. | |
| 2023/0070882 A1 | 3/2023 | Youn et al. | |
| 2023/0179996 A1* | 6/2023 | Preda | H04W 12/033 726/26 |
| 2023/0292230 A1* | 9/2023 | Jagannatha | H04L 45/66 |
| 2024/0015567 A1* | 1/2024 | Mladin | H04W 28/0268 |
| 2024/0323244 A1* | 9/2024 | Iniesta Gonzalez | H04L 65/1069 |

FOREIGN PATENT DOCUMENTS

| | | |
|---|---|---|
| CN | 113728664 A | 11/2021 |
| JP | 2022518211 A | 3/2022 |
| WO | 2021162393 A1 | 8/2021 |

\* cited by examiner

USING OR APPLYING USER EQUIPMENT ROUTE SELECTION POLICY INFORMATION WHEN OPERATING A USER EQUIPMENT CONNECTED TO A TELECOMMUNICATIONS NETWORK

CROSS-REFERENCE TO PRIOR APPLICATIONS

This application is a U.S. National Phase application under 35 U.S.C. § 371 of International Application No. PCT/EP2023/056736, filed on Mar. 16, 2023, and claims benefit to European Patent Application No. EP 22164347.1, filed on Mar. 25, 2022. The International Application was published in English on Sep. 28, 2023 as WO 2023/180163 A1 under PCT Article 21(2).

FIELD

The present invention relates a method for using or applying user equipment route selection policy information when operating a user equipment connected to a telecommunications network, the telecommunications network comprising a core network, wherein the user equipment uses or applies the route selection policy information to user plane data composed of or being carried by data packets, wherein the user equipment comprises a user equipment route selection policy functionality for using or applying the user equipment route selection policy information such that data packets comprising or carrying such user plane data are treated in accordance with the user equipment route selection policy information.

Furthermore, the present invention relates to a user equipment for using or applying user equipment route selection policy information when being operated with a telecommunications network comprising a core network, wherein the user equipment uses or applies the route selection policy information to user plane data composed of or being carried by data packets, wherein the user equipment comprises a user equipment route selection policy functionality for using or applying the user equipment route selection policy information such that data packets comprising or carrying such user plane data are treated in accordance with the user equipment route selection policy information.

Additionally, the present invention relates to a system or telecommunications network for using or applying user equipment route selection policy information when operating a user equipment connected to the telecommunications network, the telecommunications network comprising a core network, wherein the user equipment is configured to use or to apply the route selection policy information to user plane data composed of or being carried by data packets, wherein the user equipment comprises a user equipment route selection policy functionality for using or applying the user equipment route selection policy information such that data packets comprising or carrying such user plane data are treated in accordance with the user equipment route selection policy information.

Furthermore, the present invention relates to a program and to a computer-readable medium for using or applying user equipment route selection policy information according to a method according to an embodiment of the present invention.

BACKGROUND

In conventionally known telecommunications networks, in case that uplink traffic needs to be steered, a 5G mobile communication network or 5G system also defines user equipment route selection policies (or UE Routing Policies, URSPs), defined in TS 24.526, that allow the network to mandate the user equipment a set of rules on how to route data packets, i.e., based on a set of rules, such rules indicate or mandate the user equipment to steer specific traffic to a given PDU (protocol data unit) session.

In conventionally known telecommunications networks, such user equipment route selection policy rules allow for some limited routing logic to be implemented at (or by) the user equipment, e.g. user equipment route selection policy rules are limited to selecting the matching protocol data unit session (PDU session) the corresponding (data) traffic should be sent over. However, the conventionally known use of user equipment route selection policy rules is quite limited or rather static-especially regarding their structure (traffic detection), and the selection of destination PDU sessions; especially, the conventional use of user equipment route selection policy rules does neither comprise their flexible use, e.g., with regard to influencing handled traffic, potential modification of handled traffic, nor further enhanced functionality, e.g. providing communication capabilities regarding handled traffic or modifying the rules themselves.

SUMMARY

In an exemplary embodiment, the present invention provides a method for applying user equipment route selection policy information when operating a user equipment connected to a telecommunications network. The telecommunications network comprises a core network. The user equipment applies the route selection policy information to user plane data being carried by data packets. The user equipment comprises a user equipment route selection policy functionality for applying the user equipment route selection policy information such that data packets carrying such user plane data are treated in accordance with the user equipment route selection policy information. The user equipment route selection policy information comprises at least one modification and/or handling indication such that regarding a considered data packet to be treated by the user equipment route selection policy functionality. The method comprises the following steps: in a first step, the considered data packet is received by the user equipment route selection policy functionality; and in a second step and based on the content of the at least one modification and/or handling indication one or more of the following actions is performed by the user equipment route selection policy functionality: the considered data packet is treated such as to be buffered, the considered data packet is modified and treated such as to be assigned to a specific protocol data unit session of the user equipment, a notification is transmitted, by the user equipment, to the core network of the telecommunications network, or the user equipment route selection policy information is modified.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
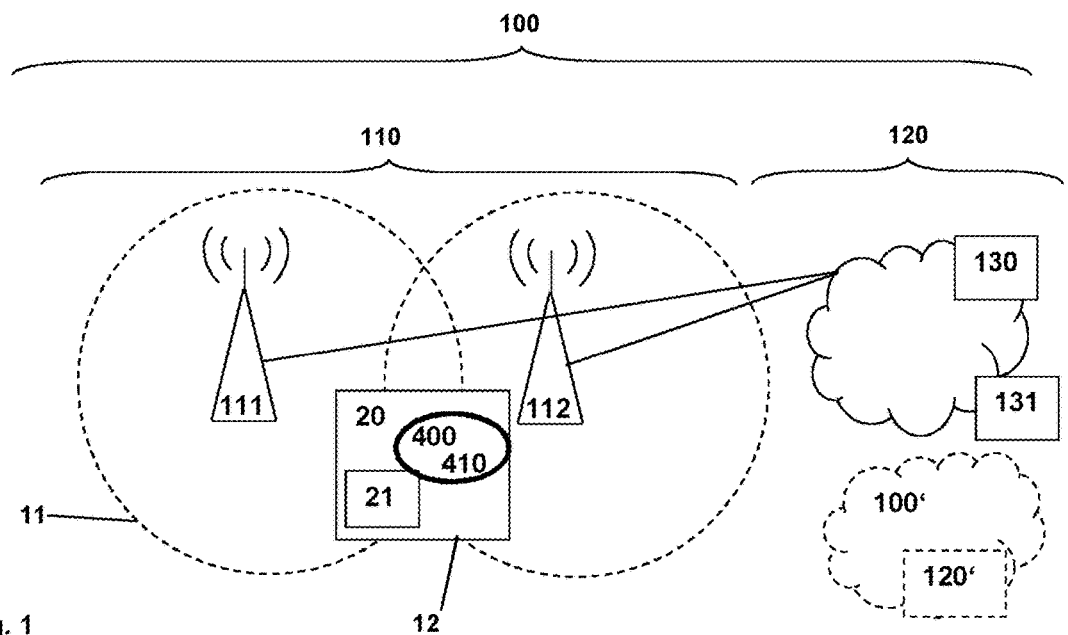
FIG. 1 schematically illustrates a telecommunications network comprising an access network, a core network and a user equipment, wherein the core network typically comprises a number of network functions or services, such as a policy and charging function, the policy and charging function typically being is configured to transmit user equipment route selection policy information to the user equipment.

Exemplary embodiments of the present invention provide a technically simple, effective and cost effective solution for using or applying user equipment route selection policy information in a flexible manner when operating a user equipment connected to a telecommunications network, wherein the user equipment uses or applies the route selection policy information to user plane data composed of or being carried by data packets, and wherein the user equipment comprises a user equipment route selection policy functionality for using or applying the user equipment route selection policy information such that data packets comprising or carrying such user plane data are treated in accordance with the user equipment route selection policy information. Exemplary embodiments of the present invention further provide a corresponding user equipment, system or telecommunications network, and a corresponding program and computer-readable medium.

In an exemplary embodiment, the present invention provides a method for using or applying user equipment route selection policy information when operating a user equipment connected to a telecommunications network, the telecommunications network comprising a core network,
    wherein the user equipment uses or applies the route selection policy information to user plane data composed of or being carried by data packets,
    wherein the user equipment comprises a user equipment route selection policy functionality for using or applying the user equipment route selection policy information such that data packets comprising or carrying such user plane data are treated in accordance with the user equipment route selection policy information,
    wherein the user equipment route selection policy information comprises at least one modification and/or handling indication such that regarding a considered data packet to be handled or treated by the user equipment route selection policy functionality, the method comprises the following steps:
        in a first step, the considered data packet is received by the user equipment route selection policy functionality,
        in a second step and based on or in dependency of the content of the at least one modification and/or handling indication one or more of the following actions is performed:
            the considered data packet is treated such as to be dropped or buffered,
            the considered data packet is modified and treated such as to be assigned or fed to a specific protocol data unit session of the user equipment,
            a notification is transmitted, by the user equipment, to the core network of the telecommunications network,
            the user equipment route selection policy information is modified.

According to the present invention, it is advantageously possible that the limitations in accordance or associated with the conventionally known use of user equipment route selection policy information are able to be overcome:

Typically, data, especially user plane data, to be transmitted by user equipments (that are connected to a telecommunications network) are carried or transported via data packets, and the user equipment route selection policy information (or the user equipment route selection policy rules contained in or comprised by this user equipment route selection policy information) indicate or prescribe how such data packets, typically or often (but not necessarily) upstream data packets, are to be handled by the user equipment. Conventionally, the handling options regarding such data packets merely or predominantly just involve the decision via which protocol data unit session a considered data packet shall be transported.

According to the present invention, the possible handling options regarding such data packets are extended. Especially, it is, e.g., advantageously possible according to the present invention that user equipment route selection policies or user equipment route selection policy rules are able to modify (or, rather, are able to prescribe (to the user equipment route selection policy functionality of the user equipment) to modify) data packets, e.g. data packets routed using a given user equipment route selection policy rule or a given protocol data unit session (e.g. this might include to modify header contents or the traffic (or data packet) itself, e.g., via encrypting at least parts of the data packet, especially its payload part). Furthermore according to the present invention, it is, e.g., advantageously possible that user equipment route selection policies or user equipment route selection policy rules are able to drop or to buffer (or, rather, are able to prescribe (to the user equipment route selection policy functionality of the user equipment) to drop or to buffer) data packets.

Furthermore according to the present invention, it is, e.g., advantageously possible that user equipment route selection policies or user equipment route selection policy rules are able to transmit (or, rather, are able to prescribe (to the user equipment route selection policy functionality of the user equipment) to transmit) one or more notifications triggered by certain events, such as, e.g., a first data packet of a data stream (of data packets, i.e. the data stream comprising, typically, a multitude of different data packets, typically sequentially or almost sequentially, having a related payload content such as, e.g., portions of a video or audio stream, or related to an application).

Furthermore according to the present invention, it is, e.g., advantageously possible that user equipment route selection policies or user equipment route selection policy rules are able to modify, especially to delete or to invalidate (or, rather, are able to prescribe (to the user equipment route selection policy functionality of the user equipment) to modify, especially to delete or to invalidate) a user equipment route selection policy information, especially the same user equipment route selection policy rule (i.e. a user equipment route selection policy rule prescribes its own modification, especially its deletion or invalidation). This modification, especially deletion or invalidation, being likewise triggered by a certain event.

According to a method according to an embodiment of the present invention, the user equipment route selection policy information is used or applied (or is able to be used or applied) in a more flexible manner by a user equipment when it is operated connected to a telecommunications network. The telecommunications network typically comprises a core network that normally transmits user equipment route selection policy information to the user equipment in order to be applied by the user equipment (or, rather, by the user equipment route selection policy functionality of the user equipment), typically applied to user plane data (composed of or being carried by data packets). The user equipment route selection policy functionality is typically the instance or functionality, within or as part of the user equipment, that ensures the correct use (or interpretation) and/or application of the user equipment route selection policy information, i.e. such that data packets comprising or carrying such user plane data are treated in accordance with the user equipment route selection policy information.

According to the present invention, in order to advantageously provide the possibility to overcome the limitations associated with the conventionally known use of user equipment route selection policy information, the user equipment route selection policy information comprises at least one modification and/or handling indication, the modification and/or handling indication corresponding to the part (or the plurality of parts) of the user equipment route selection policy information (i.e. of one or of a plurality of user equipment route selection policy rules) that indicates (or prescribes) one or a plurality of handling options or actions with regard to one or a plurality of data packets. Hence, according to the present invention, a considered data packet is able to be handled or treated (in a manner indicated or prescribed by the at least one modification and/or handling indication as part of the user equipment route selection policy information), by the user equipment or, rather, the user equipment route selection policy functionality, by performing the steps of receiving, by the user equipment route selection policy functionality, the considered data packet, and, in a second step and based on or in dependency of the content of the at least one modification and/or handling indication, performing one or more of the following actions:
  the considered data packet is treated such as to be dropped or buffered,
  the considered data packet is modified and treated such as to be assigned or fed to a specific protocol data unit session of the user equipment,
  a notification is transmitted, by the user equipment, to the core network of the telecommunications network,
  the user equipment route selection policy information is modified (e.g. traffic descriptor modification, route descriptor, route selection, precedence, application descriptor modification, modification/removal of route selection validation criteria, removal/disabling of the user equipment route selection rule).

Hence, according to the present invention, it is advantageously possible to enable user equipment route selection policy rules (or, generally, user equipment route selection policy information) to modify routed data traffic, e.g. via a modification of data packet headers (e.g. DSCP headers) and/or via applying or performing encryption of data packets (or, at least, parts thereof), e.g. between the user equipment and a gateway in the core network, or between the user equipment and the home network (e.g. a home public land mobile network) gateway, or between the user equipment and a third party (e.g. an application provider or application server entity, i.e. the data packets possibly traversing, in encrypted form, not only an access network and/or a visited network but also the home network of the user equipment).

Furthermore it is advantageously possible to enable user equipment route selection policies (or user equipment route selection policy rules) to specify to drop or to buffer traffic (i.e. data packets).

Additionally according to the present invention, it is furthermore advantageously possible to also overcome the limitations associated with the conventionally known use of user equipment route selection policy information via not only taking into account a data packet more or less in an isolated manner, but by considering a data stream, i.e. a stream of data packets (meaning more than one data packet). Such a data stream or stream of data packets also has properties (e.g. its history or data volume or bandwidth requirements or packet data rate) which are not able to be associated with one data packet of that stream individually. According to the present invention, it is advantageously also possible that, based on or in dependency of the content of the at least one modification and/or handling indication, one or more actions is/are performed based on a property (or properties) of a considered data stream, i.e. according to the present invention the user equipment route selection policy information comprises at least one modification and/or handling indication such that regarding a considered data packet (as part of a considered data stream or a considered stream of data packets) to be handled or treated by the user equipment route selection policy functionality, the method comprises the steps of:
  in the first step, the considered data packet is received by the user equipment route selection policy functionality as part of the considered data stream or the considered stream of data packets,
  in a second step and based on or in dependency of the content of the at least one modification and/or handling indication one or more of the following actions is performed:
    the considered data packet is treated such as to be dropped or buffered,
    the considered data packet is modified and treated such as to be assigned or fed to a specific protocol data unit session of the user equipment,
    the considered data packet is treated such as to be assigned or fed to a further specific protocol data unit session of the user equipment, different from a protocol data unit session used with regard to the preceding data packet of the considered data stream or the considered stream of data packets,
    a notification is transmitted, by the user equipment, to the core network of the telecommunications network,
    the user equipment route selection policy information is modified.

According to such an embodiment of the present invention, instead of considering only one data packet (i.e. 'the considered data packet'), a data stream or stream of data packets is considered, i.e. at least two data packets, and the user equipment route selection policy information comprises the at least one modification and/or handling indication such that, regarding a considered preceding data packet—the considered data packet and the considered preceding data packet especially belonging to a data stream or to the same data stream (or stream of data packets), and the considered preceding data packet precedes the considered data packet—, the method comprises a third step prior to the first step, wherein, in the third step, the considered preceding data packet is received by the user equipment route selection policy functionality and, based on or in dependency of the content of the at least one modification and/or handling indication, the considered preceding data packet is treated such as to be assigned or fed to a specific protocol data unit session of the user equipment.

Hence, according to such an embodiment of the present invention, the data stream (or stream of data packets) considered has, up to the considered preceding data packet, properties such that a specific trigger condition is not yet fulfilled or verified (and, hence, typically the data packets of such data stream are assigned or fed to a specific protocol data unit session, or 'normal' protocol data unit session), whereas such trigger condition is fulfilled or verified upon reception, at the user equipment route selection policy functionality, or upon treatment of the considered data packet (subsequent to the considered preceding data packet), resulting in performing one or a plurality of the mentioned actions (including dropping or buffering or modifying the considered data packet, or transmitting a notification or modifying the user equipment route selection policy information).

In this respect, it is especially preferred according to the present invention, that the considered data packet is treated-alternatively or cumulatively to one or more of the actions of or defined in the second step-such as to be assigned or fed to a further specific protocol data unit session of the user equipment, different from the specific (or 'normal') protocol data unit session (i.e. the specific protocol data unit session being the normal (or default or prescribed) protocol data unit session for the data packets of the considered data stream).

According to the present invention, via being able, based on or in dependency of the content of the at least one modification and/or handling indication, to perform one or a plurality of actions based on a property (or a trigger condition) of or associated with the considered data packet and/or based on a property (or a trigger condition) of or associated with the data stream (or the stream of data packets) of the considered preceding data packet and the considered data packet, it is advantageously possible that:

user equipment route selection policies (or user equipment route selection policy rules) are able to enforce bandwidth constrains (e.g. maximum bandwidth, maximum packet data rate) and/or to define what happens to traffic exceeding said constrains;
  a per-application and/or per-network slice granularity is realized regarding quality-of-service parameters: while protocol data unit sessions allow for quality-of-service flows, user equipment route selection policies or user equipment route selection policy rules are able to work on a per-application and/or per-slice granularity, which is different from the one supported by PDU sessions;
  a more distributed traffic processing architecture is enabled: in conventionally known telecommunications networks (or network architectures), all traffic enforcing functionality is based on the gateway (user plane function in the case of 5G networks); hence, in order to better support exponential traffic growth, offloading parts of the (traffic enforcing functionality) computing to the user equipment, results in a more distributed traffic processing architecture;
  user equipment route selection policies or user equipment route selection policy rules are enabled to enforce bandwidth-related constrains, especially in order to enable user equipment route selection policy rules to specify bandwidth throttling and/or to specify to drop traffic and/or—overlapping both, and regarding a generic case—to enable user equipment route selection policy rules to contain code processing logic, i.e. a program/script/code specifying how the traffic is to be processed, enabling all the above mentioned actions, e.g. for handling data packets, and, hence, not only the corresponding functionality (e.g. of modifying, dropping, or buffering data packets) but also implementing logic operations (e.g. conditions, loops, function calls, communication with other modules, or the like)— hence, according to the present invention, providing the possibility to deploy data processing logic (instead of parameters) allows for an increased flexibility and in effect allows to convert the user equipment into a programmable part of the telecommunications network;
  the user equipment is allowed to perform more traffic processing, which in turn allows for more distributed (network) architectures where central nodes (e.g. a user plane function or gateway entity or functionality) can be kept simpler and concentrate on how the aggregate traffic is to be shaped, while tasks relative to an individual subscription (e.g. maximum bandwidth) can be offloaded to the user equipment;
  via the modification and/or handling indication being able to trigger notifications (in case of certain trigger event), it is possible, e.g., for the core network (of the telecommunications network) to have visibility on the actual usage of user equipment route selection policy information (especially user equipment route selection policy rules) by a user equipment and/or to automate changes based on said usage (e.g.: notify the core network and/or limit the validity of a given user equipment route selection policy rule based on usage, e.g. when the user equipment route selection policy rule is first used, at regular time intervals, after a given amount of data has been processed, when the user equipment is under low/medium/high packet load, when a data packet burst is detected/finished, when data packets of certain characteristics have been processed, when one or more data packets have been dropped/buffered/modified);
  alternatively to offloading functionality to the user equipment, via the modification and/or handling indication being able to trigger notifications, the telecommunications network can compare usage reports generated by the user equipment with usage reports from the network side and assess whether user equipment route selection policy rules are correctly applied by the user equipment
  that the modification and/or handling indication comprises, e.g., traffic-based triggers (i.e. depending on the usage of a given user equipment route selection policy rule) such that, e.g., a notification is sent towards the (core) network in case that certain criteria are met and/or the user equipment route selection policy rule is modified and/or the user equipment route selection policy rule automatically expires (e.g. it is either deleted or marked as invalid);

that a more distributed (network) architecture is made possible via providing a more flexible management of user equipment route selection policy information or user equipment route selection policy rules, especially via:

a user equipment route selection policy-based implementation of data caps that can be enforced at the user equipment side, such as "up to X GB can be sent via a low-latency slice (user equipment route selection policy rule A), afterwards a default slice is used (user equipment route selection policy rule B)", user equipment-based generation of notifications towards the (core) network regarding traffic matching certain rules, which are able to be used, e.g., for charging purposes and/or to allow measurement of quality-of-service parameters of the data being routed and/or to allow data volume measurements (e.g. the number of (data) packets, data volume, packet/data rates, packet types) and/or to allow measurement of expiration of user equipment route selection policy time window-hence generally, to allow the (core) network more visibility regarding the usage, by the user equipment, of user equipment route selection policy rules.

According to the present invention, the telecommunications network typically comprises an access network and a core network; however, the present invention is also related to situations where the telecommunications network does not comprise, strictly speaking, both an access network and a core network, but where the telecommunications network is only associated or assigned to an access network (and especially comprises the core network), or where the telecommunications network is only associated or assigned to a core network (and especially comprise the access network), or where the telecommunications network is only associated or assigned to both an access network and a core network. According to the present invention, the core network especially provides the user equipment with data connectivity towards a data network.

In conventionally known telecommunications networks as well as according to the present invention, a user equipment is typically able to be connected, via the core network, to a data network. The user equipment typically communicates with the access network (or radio access network) via an interface, typically a radio interface or air interface. This is used for conveying both signaling information and data traffic, but there is typically a logical separation (logical channels) for the transport of both types of traffic. Likewise, between the access network (especially the radio access network, and especially a gNB base station entity) and the core network, signaling information and user data are typically separated. In order to establish a data connection enabling a user equipment to communicate with a data network (or with the core network), a protocol data unit (PDU) session is required. A protocol data unit session is a logical data transport channel terminated at the core network that provides connectivity to a data network. A protocol data unit session can have one or more an associated quality-of-service for the underlying transported data (e.g. one or more quality-of-service flows within the PDU session). The protocol data unit session establishment is performed by the user equipment via the radio interface; the radio access network is aware of protocol data unit sessions (it needs the information to e.g. do physical resource allocation on the Uu reference point between the base station entity (especially gNB) and the user equipment) but the protocol data unit session is managed by the core network. Currently, distinct protocol data unit sessions are regarded as independent, i.e. a protocol data unit session establishment is not linked to other protocol data unit session establishment requests.

In currently known telecommunications networks as well as according to the present invention, user equipment route selection policy information or user equipment route selection policy rules is/are used by the telecommunications network to oblige user equipments to use a set of rules to apply to, or steer, uplink traffic, i.e. how to route data packets. Especially such user equipment route selection policy rules indicate or mandate the user equipment to steer specific traffic to a given, or predetermined, protocol data unit session. Especially such user equipment route selection policy rules or such user equipment route selection policy information is set or defined by the core network of the telecommunications network, i.e. the telecommunications network (or the core network thereof) sets a user equipment route selection policy rule or user equipment route selection policy information via transmitting a corresponding message to the user equipment as part of the control data flow exchange between the telecommunications network and the user equipment over the air interface between the user equipment and the corresponding access network element, typically a base station entity such as, e.g., a gNodeB entity. As a consequence of the user equipment receiving such a user equipment route selection policy rule (or plurality thereof) or user equipment route selection policy information, the user equipment is able to apply or will apply such rule information, i.e. traffic, especially application traffic (in uplink direction, towards the telecommunications network) that matches the corresponding user equipment route selection policy rule or user equipment route selection policy information is routed, by the user equipment, as mandated or prescribed by the user equipment route selection policy rule/information, e.g. "steer specific traffic to a given protocol data unit session", wherein in currently known telecommunications networks, the route corresponds to a protocol data unit session in the sense of "where the user equipment sends traffic to".

In currently known telecommunications networks, the user equipment route selection policy rules or user equipment route selection policy information itself, i.e. especially its structure, is defined in 3GPP TS 23.503 and is a set of one or more user equipment route selection policy rules, where a user equipment route selection policy rule is generally composed of three parts, namely a precedence value as the first part, a traffic descriptor as the second part, and one or more route selection descriptors as the third part.

The precedence value (as the first part of a user equipment route selection policy rule) of the URSP rule identifies the precedence of the considered URSP rule among all the existing URSP rules (either already present at the user equipment or transmitted as part of the user equipment route selection policy information). The traffic descriptor (as the second part of a user equipment route selection policy rule) includes either a match-all traffic descriptor, or at least one of the following components: one or more application identifiers, one or more IP 3 tuples as defined in 3GPP TS 23.503, i.e. the destination IP address, the destination port number, and the protocol in use above the IP, one or more non-IP descriptors, i.e. destination information of non-IP traffic, one or more DNNs (data network name), one or more connection capabilities, one or more domain descriptors, i.e. destination FQDN(s) (fully qualified domain name(s)). Each route selection descriptor (as the third part of a user equipment route selection policy rule) includes a precedence value of the route selection descriptor and either a non-seamless non-3GPP offload indication, or one PDU session type and, optionally, one or more of the following: SSC mode (session and service continuity mode), one or more S-NSSAIs (Single Network Slice Selection Assistance Information), one or more DNNs, a preferred access type, a multi-access preference, a time window, and location criteria.

In this context, the time window indication and the location criteria are part of the route selection descriptor (or third part of a user equipment route selection policy rule) even though they do not actually describe the traffic routing but, rather, correspond to route selection validation criteria: a given or considered route selection descriptor is not considered valid unless all the provided validation criteria are met and controls the validity of said element. The components describing the actual routing correspond to route selection components. Exemplarily, what user equipment route selection policy rules achieve is a ruleset at the user equipment so that specific traffic can be sent via a specific traffic description (e.g. access type).

Regarding the application of user equipment route selection policy rules or user equipment route selection policy information, (specified in TS 23.503, 6.6.2.3), for every newly detected application (i.e. requiring an uplink data stream to be transmitted by the user equipment), the user equipment evaluates the available (i.e. stored or received) user equipment route selection policy rules in the order of rule precedence and determines if the application is matching the traffic descriptor of any URSP rule; when a URSP rule is determined to be applicable for a given application (clause 6.6.2.1), the user equipment shall select a route selection descriptor within this URSP rule in the order of the route selection descriptor precedence; if the user equipment determines that there is more than one matching and existing protocol data unit session (e.g. the selected route selection descriptor only specifies the network slice selection, while there are multiple existing PDU Sessions matching the network slice selection with different DNNs), it is up to user equipment implementation to select one of them to use.

According to the present invention, a user equipment is considered that is connected to a telecommunications network, and the telecommunications network comprises a core network that comprises a policy and charging function. The policy and charging function is configured to transmit user equipment route selection policy information to the user equipment.

According to the present invention, it is furthermore advantageously possible and preferred that, especially as part of the route selection descriptors or as part of the route selection components of the user equipment route selection policy information, the modification and/or handling indication comprises or corresponds to a bandwidth (e.g. based on data throughput or packet data rate) limit indication or the user equipment route selection policy information comprises a bandwidth limit indication (especially as the modification and/or handling indication), wherein especially a bandwidth limit is reached with or subsequent to the considered preceding data packet, resulting in subsequent traffic, especially the considered data packet, being throttled, especially via the considered data packet being dropped or buffered or assigned or fed to the further specific protocol data unit session instead of the specific protocol data unit session, wherein especially a bit rate associated with the data stream is able to be controlled or shaped, especially enforcing or providing a maximum bit rate or a guaranteed bit rate or a packet rate, wherein especially the bandwidth limit indication comprises an indication such that the handling of excess traffic is able to be defined, especially via buffering such excess traffic and/or dropping such excess traffic and/or applying a predefined user equipment route selection policy rule to such excess traffic, wherein especially dropping excess traffic is performed via the bandwidth limit indication comprising a traffic sink indication as part of the route selection descriptors or as part of the route selection components of the user equipment route selection policy information, wherein especially reaching the bandwidth limit with or subsequent to the considered preceding data packet, results in a notification or message being transmitted, by the user equipment, towards the core network and/or to an application server entity.

It is thereby advantageously possible to realize and implement a method according to an embodiment of the present invention in a comparatively simple and efficient manner: Via using a bandwidth limit indication, it is advantageously possible to apply bandwidth limitation rules as part or user equipment route selection policy rules.

According to the present invention, it is furthermore advantageously possible and preferred that, especially as part of the route selection descriptors or as part of the route selection components of the user equipment route selection policy information, the modification and/or handling indication comprises or corresponds to a header modification indication or the user equipment route selection policy information comprises a header modification indication (especially as the modification and/or handling indication), wherein especially the header modification indication comprises a description of header parameters to change, especially differentiated services field codepoints header parameters on or of the data packets being routed using the corresponding user equipment route selection policy rule, wherein especially, the header modification indication comprises a value information to use and one or a plurality of the following: a header identifier, a name, a position, and a variable type, especially a string type indication or an integer type indication.

It is thereby advantageously possible to realize and implement a method according to an embodiment of the present invention in a comparatively simple and efficient manner: Via using a header modification indication, it is advantageously possible to modify data packets regarding their header values.

Furthermore, it is advantageously possible and preferred according to the present invention that, especially as part of the route selection descriptors or as part of the route selection components of the user equipment route selection policy information, the modification and/or handling indication comprises or corresponds to a traffic encryption indication or the user equipment route selection policy information comprises a traffic encryption indication (especially as the modification and/or handling indication), wherein especially the traffic encryption indication comprises encryption parameters that are:
provided by the telecommunications network or
provided by another telecommunications network or
provided by a third party, wherein data packets to be transmitted by the user equipment, especially the considered data packet and/or the considered preceding data packet, are modified via encrypting, at least the payload or parts thereof, such data packets, wherein especially the encrypted part of such data packets is able to be decrypted by the telecommunications network or by the other telecommunications network or by the third party, wherein especially the other telecommunications network corresponds to the home network of the user equipment and/or wherein the third party corresponds to an application server entity or an application provider.

It is thereby advantageously possible to efficiently realize and implement a method according to an embodiment of the present invention in a comparatively simple and efficient manner; via using a traffic encryption indication, it is advantageously possible to provide for a more secure and confidential communication.

Furthermore, it is advantageously possible and preferred according to the present invention that, especially as part of the route selection descriptors or as part of the route selection components of the user equipment route selection policy information, the modification and/or handling indication comprises or corresponds to a processing logic indication or the user equipment route selection policy information comprises a processing logic indication (especially as the modification and/or handling indication), wherein especially the processing logic indication comprises program elements comprising logic code, wherein especially the logic code or the program elements comprise:
traffic manipulation instructions describing the processing of traffic, especially as interpretable or compilable source code,
logic code metadata providing verifiable information regarding the origin of the logic code, and/or
machine-readable program, especially interfacing the processing input and/or output of the user equipment route selection policy functionality as compiled or executable code.

It is thereby advantageously possible to realize and implement a method according to an embodiment of the present invention in a comparatively simple and efficient manner: Via using a processing logic indication, it is advantageously possible to increase the flexibility in using user equipment route selection policy rules or user equipment route selection policy information.

Furthermore, it is advantageously possible and preferred according to the present invention that, especially as part of the route selection descriptors or as part of the route selection components of the user equipment route selection policy information, the modification and/or handling indication comprises or corresponds to a notification indication or the user equipment route selection policy information comprises a notification indication (especially as the modification and/or handling indication), wherein especially, the user equipment route selection policy functionality comprises a key performance indicator monitoring functionality, wherein the transmission, by the user equipment, of a notification is triggered in case that a key performance indicator threshold is detected to be reached or exceeded related to a specific key performance indicator,
wherein the specific key performance indicator is or relates to the amount (e.g. bytes, number of packets), content (e.g. destination address), characteristics (e.g. inter-packet time) and/or nature (e.g. protocol type) of data routed by the respective user equipment route selection policy rule and/or to a charging data record.

It is thereby advantageously possible to realize and implement a method according to an embodiment of the present invention in a comparatively simple and efficient manner: Via using a notification indication, it is advantageously possible to transmit notifications to the core network and thereby to keep the core network informed about uplink traffic management of the user equipment.

Furthermore, it is advantageously possible and preferred according to the present invention that, especially as part of the route selection descriptors or as part of the route selection components of the user equipment route selection policy information, the modification and/or handling indication comprises or corresponds to a rule modification indication or the user equipment route selection policy information comprises a rule modification indication (especially as the modification and/or handling indication),
wherein especially, the user equipment route selection policy functionality comprises a key performance indicator monitoring functionality, wherein the modification of a user equipment route selection policy rule to be applied is triggered in case that a key performance indicator threshold is detected to be reached or exceeded related to a specific key performance indicator,
wherein the specific key performance indicator is or relates to the amount of data routed by the respective user equipment route selection policy rule and/or to a charging data record, wherein especially the validity status of the corresponding user equipment route selection policy rule is changed by the key performance indicator threshold being detected to be reached or exceeded.

It is thereby advantageously possible to realize and implement a method according to an embodiment of the present invention in a comparatively simple and efficient manner: Via using a rule modification indication, it is advantageously possible to increase the flexibility in using user equipment route selection policy rules or user equipment route selection policy information.

Furthermore, it is advantageously possible and preferred according to the present invention that in case that a notification is transmitted, by the user equipment and especially to the core network of the telecommunications network and/or to its home core network, as a result of applying a specific user equipment route selection policy rule, and especially as a result of the or a part of a modification and/or handling indication of that specific user equipment route selection policy rule or as a result of the modification and/or handling indication of that specific user equipment route selection policy rule corresponding to or comprising one or a plurality of a bandwidth limit indication, a header modification indication, a traffic encryption indication, a notification indication, and a rule modification indication,
the notification at least comprises the following information:
a reference information to the generating specific user equipment route selection policy rule and/or a reference information to the generating modification and/or handling indication, and/or
a trigger event information indicating or relating to the trigger event or to the trigger condition triggering the generation of the notification.

It is thereby advantageously possible according to the present invention to realize and implement a method according to an embodiment of the present invention in a comparatively simple and efficient manner such that a notification generated by the user equipment and transmitted, typically to the core network or its home core network, is able to be meaningfully processed.

Furthermore, the present invention relates to a user equipment for using or applying user equipment route selection policy information when being operated with a telecommunications network comprising a core network, wherein the user equipment uses or applies the route selection policy information to user plane data composed of or being carried by data packets, wherein the user equipment comprises a user equipment route selection policy functionality for using or applying the user equipment route selection policy information such that data packets comprising or carrying such user plane data are treated in accordance with the user equipment route selection policy information, wherein the user equipment route selection policy information comprises at least one modification and/or handling indication such that regarding a considered data packet to be handled or treated by the user equipment route selection policy functionality, the user equipment is configured such that:

the considered data packet is received by the user equipment route selection policy functionality, based on or in dependency of the content of the at least one modification and/or handling indication one or more of the following actions is performed:

the considered data packet is treated such as to be dropped or buffered, the considered data packet is modified and treated such as to be assigned or fed to a specific protocol data unit session of the user equipment, a notification is transmitted, by the user equipment, to the core network of the telecommunications network, the user equipment route selection policy information is modified.

Furthermore, the present invention relates to a system or telecommunications network for using or applying user equipment route selection policy information when operating a user equipment connected to the telecommunications network, the telecommunications network comprising a core network, wherein the user equipment is configured to use or to apply the route selection policy information to user plane data composed of or being carried by data packets, wherein the user equipment comprises a user equipment route selection policy functionality for using or applying the user equipment route selection policy information such that data packets comprising or carrying such user plane data are treated in accordance with the user equipment route selection policy information, wherein the user equipment route selection policy information comprises at least one modification and/or handling indication such that regarding a considered data packet to be handled or treated by the user equipment route selection policy functionality, the system, comprising the user equipment and the telecommunications network, or the telecommunications network is configured such that:

the considered data packet is received by the user equipment route selection policy functionality, based on or in dependency of the content of the at least one modification and/or handling indication one or more of the following actions is performed:

the considered data packet is treated such as to be dropped or buffered, the considered data packet is modified and treated such as to be assigned or fed to a specific protocol data unit session of the user equipment, a notification is transmitted, by the user equipment, to the core network of the telecommunications network, the user equipment route selection policy information is modified.

Additionally, the present invention relates to a program comprising a computer readable program code which, when executed on a computer and/or on a user equipment and/or on a network node of a telecommunications network, especially a policy and charging function, or in part on the user equipment and/or in part on the network node of a telecommunications network, especially the policy and charging function, causes the computer and/or the user equipment and/or the network node of a telecommunications network to perform a method according to an embodiment of the present invention.

Additionally, the present invention relates to a computer-readable medium comprising instructions which when executed on a computer and/or on a user equipment and/or on a network node of a telecommunications network, especially a policy and charging function, or in part on the user equipment and/or in part on the network node of a telecommunications network, especially the policy and charging function, causes the computer and/or the user equipment and/or the network node of a telecommunications network to perform a method according to an embodiment of the present invention.

These and other characteristics, features and advantages of the present invention will become apparent from the following detailed description, taken in conjunction with the accompanying drawings, which illustrate, by way of example, the principles of the invention. The description is given for the sake of example only, without limiting the scope of the invention. The reference figures quoted below refer to the attached drawings.

The present invention will be described with respect to particular embodiments and with reference to certain drawings, but the invention is not limited thereto but only by the claims. The drawings described are only schematic and are non-limiting. In the drawings, the size of some of the elements may be exaggerated and not drawn on scale for illustrative purposes.

Where an indefinite or definite article is used when referring to a singular noun, e.g. "a", "an", "the", this includes a plural of that noun unless something else is specifically stated.

Furthermore, the terms first, second, third and the like in the description and in the claims are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

In FIG. 1, a telecommunications network 100 comprising an access network 110, and a core network 120 is schematically shown. The telecommunications network 100, especially the core network 120, typically comprises a number of network functions or services, such as a policy and charging function 130, the policy and charging function 130 typically being configured to transmit user equipment route selection policy information 400 to the user equipment 20. The access network 110 comprises a plurality of radio cells 11, 12. In the exemplary situation or scenario shown in FIG. 1, a first base station entity 111 generates or is associated with or spans the first radio cell 11, and a second base station entity 112 generates or is associated with or spans the second radio cell 12. The user equipment 20 comprises user equipment route selection policy information 400, and a user equipment route selection policy functionality 21 such that user equipment route selection policy information 400—especially user equipment route selection policy rules—are able to be applied correctly, i.e. that the different upstream traffic streams (i.e. the respective relating data packets) that the user equipment 20 is transmitting, typically to the core network 120, are able to be handled correctly. According to the present invention, the user equipment route selection policy information 400 comprises at least one modification and/or handling indication 410.

The user equipment 20 is typically, but not necessarily, mobile i.e. able to move with respect to the (typically, but not necessarily, static) radio cells 11, 12 or corresponding base station entities 111, 112 of the access network 110. In the exemplarily represented illustration of FIG. 1, the core network 120 comprises or is connected to a data network 131. The core network 120 provides the user equipment 20 with data connectivity towards the data network 131.

Furthermore, a user equipment route selection policy repository 125 is at least accessible via the telecommunications network 100, and it is especially part of the telecommunications network 100 or of the core network 120 thereof.

FIG. 1 primarily shows the simple situation that the user equipment 20 is connected to its home network 100, especially its home public land mobile network, i.e. the telecommunications network 100 represented in FIG. 1 corresponds to the home network of the user equipment 20. In any case, the user equipment 20 is connected using access network 120, typically a radio access network.

In case this access network 120 does not correspond to (or belong to) the home network or home public land mobile network of the user equipment 20 (i.e. in case the telecommunications network 100 is not the home network of the user equipment 20), the access network 120 to which the user equipment 20 is connected is called the visited network or visited public land mobile network of the user equipment 20; and in this case, the user equipment 20 is typically also connected to its home network, or to the core network of its home network. This is schematically shown, in FIG. 1, via a (further) telecommunications network 100' (i.e. the home network of the user equipment 20 in case that telecommunications network 100 is the visited network), and a corresponding (further) core network 120'.

Figure 2:
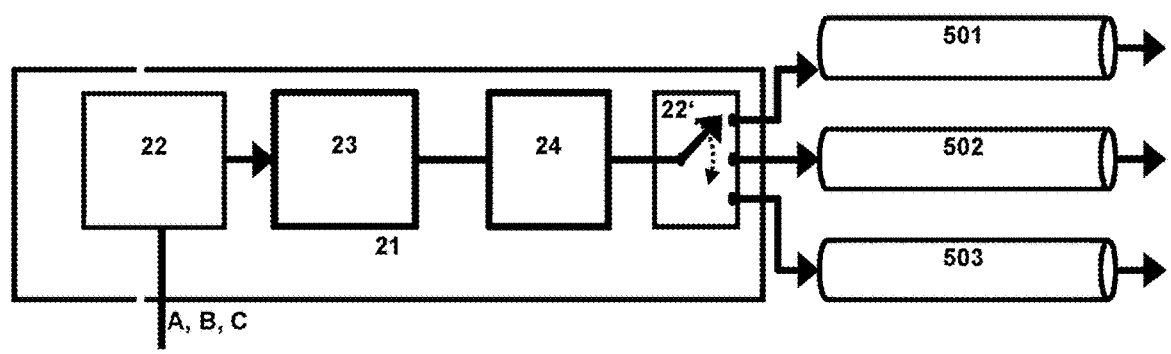
FIGS. 2 and 3 schematically illustrate different variants or embodiments of the user equipment route selection policy functionality, within or as part of the user equipment, in greater detail, hinting at its functionality.
Figure 3:
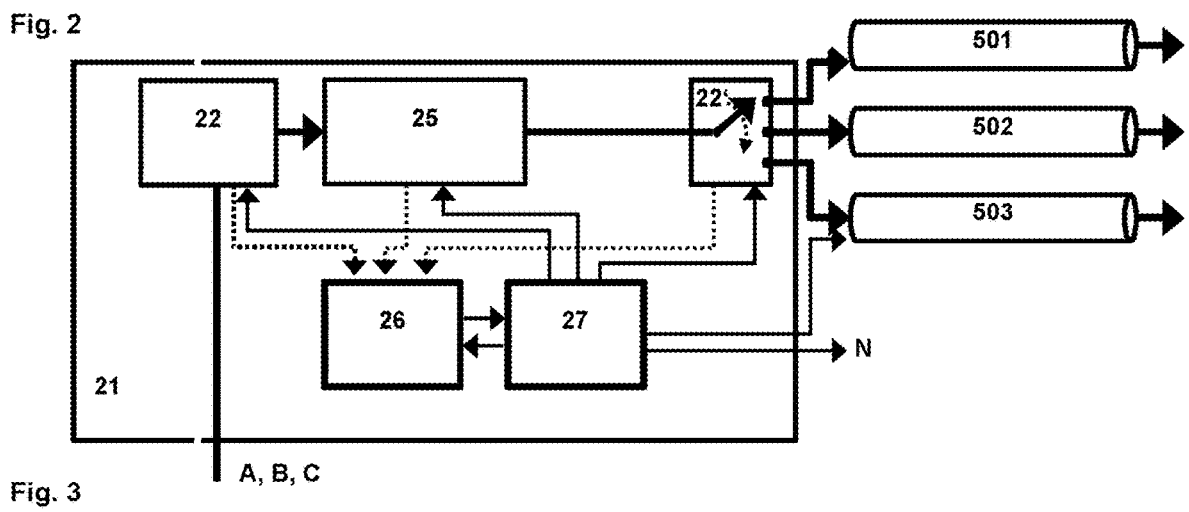

In FIGS. 2 and 3, the user equipment route selection policy functionality 21 is schematically shown in greater detail according to different embodiments or variants according to the present invention. Generally speaking and referring to both FIGS. 2 and 3, the user equipment route selection policy functionality 21 provides the handling of different data streams or data packets to be transmitted by the user equipment 20, typically in upstream direction to the core network 120 of the telecommunications network 100. The different data streams—i.e. the respective data packets—are schematically shown as entering the user equipment route selection policy functionality 21 from its bottom side, indicated via reference signs A, B, C representing exemplarily three different data streams or streams of data packets.

According to both embodiments or variants of the user equipment route selection policy functionality 21, the user equipment route selection policy functionality 21 comprises a traffic selection functionality 22. Via the traffic selection functionality 22, the different data packets of the different data streams A, B, C are typically matched to corresponding user equipment route selection policy information 400, especially corresponding user equipment route selection policy rules (as part of the user equipment route selection policy information 400), wherein user equipment route selection policy rules apply only to matching traffic (i.e. matching data packets).

Eventually, the data packets of the different data streams A, B, C are specifically steered to a given protocol data unit session, three of such protocol data unit sessions are schematically shown in FIGS. 2 and 3, designated via reference signs 501, 502, 503. The route selection is especially performed via a route selection functionality 22' using a route selection descriptor to determine where (i.e. to which protocol data unit session 501, 502, 503) to send the respective traffic, i.e. a considered data packet.

According to the present invention, the modification and/or handling indication 410 especially acts as a "packet processing" route selection descriptor. In this sense, the route selection descriptor becomes, according to the present invention, a "generic traffic processing descriptor", being routing (to different protocol data unit sessions 501, 502, 503) only a subset thereof—e.g. it extends user equipment route selection policy rules 400 to cover traffic manipulation logic, and the functionality extends user equipment route selection policy functionality 21 by allowing user equipment route selection policy rules to modify and/or shape matching traffic. Furthermore, it is advantageously possible, according to the present invention, to trigger notifications towards the core network 120 and/or to modify a user equipment route selection policy rule 400 via a traffic/usage-related condition (as part of the modification and/or handling indication 410) in the user equipment route selection policy information 400, thereby allowing the modification of user equipment route selection policy rules 400 based on usage key performance indicators, as well as generating notifications/reports based on the usage of the user equipment route selection policy rules 400.

According to the embodiment of the user equipment route selection policy functionality 21 exemplarily shown in FIG. 2, the user equipment route selection policy functionality 21 comprises, besides the traffic selection functionality 22 (and the route selection functionality 22'), a traffic modification functionality 23 and a traffic shaping functionality 24. Via the modification functionality 23, the user equipment route selection policy functionality 21 is enabled to modify data traffic, i.e. modify data packet, e.g. change packet headers (of data packets) and/or encrypt data packets (or parts thereof). Via the traffic shaping functionality 24, the user equipment route selection policy functionality 21 is enabled to shape matching traffic to fit a certain traffic profile, e.g. bandwidth shaping.

According to the embodiment of the user equipment route selection policy functionality 21 exemplarily shown in FIG. 3, the user equipment route selection policy functionality 21 comprises, besides the traffic selection functionality 22 (and the route selection functionality 22'), a traffic functionality 25, a key performance indicator monitoring functionality 26, and a key performance indicator-based logic functionality 27. The key performance indicator monitoring functionality 26 performs monitoring of different key performance indicators of the user equipment 20, such as the volume of uplink user plane traffic, and the like. The key performance indicator-based logic functionality 27 is triggered based on user equipment route selection policy rules using key performance indicators (i.e. based on user equipment route selection policy usage of key performance indicators): This key performance indicator-based logic functionality 27 is able to steer the other user equipment route selection policy components or functionalities and/or is able to generate notifications (cf. reference sign N) to external entities, especially the core network 120 of the telecommunications network 100, or to internal entities, such as, e.g., applications running on the user equipment 20.

According to the present invention, it is advantageously possible to overcome the limitations associated with the conventionally known use of user equipment route selection policy information 400, especially that such user equipment route selection policy rules 400 are merely used to select a matching protocol data unit session 501, 502, 503 the corresponding (data) traffic (or data stream) A, B, C should be sent or fed to. Also according to the present invention, the user equipment route selection policy information (or the user equipment route selection policy rules contained in or comprised by this user equipment route selection policy information) indicate or prescribe how such data packets (of data streams A, B, C) are to be handled by the user equipment. According to the present invention, the possible handling options regarding such considered data packets (of data streams A, B, C) are extended. Especially, it is, e.g., advantageously possible according to the present invention that user equipment route selection policies or user equipment route selection policy rules 400 are able to modify (or, rather, are able to prescribe (to the user equipment route selection policy functionality 21 of the user equipment 20) to modify) the considered data packets, e.g. data packets routed using a given user equipment route selection policy rule or a given protocol data unit session (e.g. this might include to modify header contents or the traffic (or the considered data packet) itself, e.g., via encrypting at least parts of the considered data packet, especially its payload part).

Furthermore according to the present invention, it is, e.g., advantageously possible that user equipment route selection policies or user equipment route selection policy rules 400 are able to drop or to buffer (or, rather, are able to prescribe (to the user equipment route selection policy functionality 21 of the user equipment 20) to drop or to buffer) the considered data packets.

Furthermore according to the present invention, it is, e.g., advantageously possible that user equipment route selection policies or user equipment route selection policy rules 400 are able to transmit (or, rather, are able to prescribe (to the user equipment route selection policy functionality 21 of the user equipment 20) to transmit) one or more notifications triggered by certain events, such as, e.g., a first data packet of a data stream (of data packets). Furthermore according to the present invention, it is, e.g., advantageously possible that user equipment route selection policies or user equipment route selection policy rules are able to modify, especially to delete or to invalidate (or, rather, are able to prescribe (to the user equipment route selection policy functionality 21 of the user equipment 20) to modify, especially to delete or to invalidate) a user equipment route selection policy information 400, especially the same user equipment route selection policy rule (i.e. a user equipment route selection policy rule prescribes its own modification, especially its deletion or invalidation). This modification, especially deletion or invalidation, being likewise triggered by a certain event, e.g. a key performance indicator-related event.

Hence, according to a method according to an embodiment of the present invention, the user equipment route selection policy information 400 is used or applied (or is able to be used or applied) in a more flexible manner by a user equipment 20 when it is operated connected to a telecommunications network 100.

According to the present invention, in order to advantageously provide the possibility to overcome the limitations associated with the conventionally known use of user equipment route selection policy information, the user equipment route selection policy information 400 comprises at least one modification and/or handling indication 410 (schematically represented in FIG. 1), the modification and/or handling indication 410 corresponding to the part (or the plurality of parts) of the user equipment route selection policy information 400 (i.e. of one or of a plurality of user equipment route selection policy rules 400) that indicates (or prescribes) one or a plurality of handling options or actions with regard to one or a plurality of considered data packets. Hence, according to the present invention, a considered data packet is able to be handled or treated (in a manner indicated or prescribed by the at least one modification and/or handling indication 410 as part of the user equipment route selection policy information 400), by the user equipment 20 or, rather, the user equipment route selection policy functionality 21, by performing the steps of receiving, by the user equipment route selection policy functionality 21, the considered data packet (as part of one of data streams A, B, C), and, in a second step and based on or in dependency of the content of the at least one modification and/or handling indication 410, performing one or more of the following actions:

the considered data packet is treated such as to be dropped or buffered, the considered data packet is modified and treated such as to be assigned or fed to a specific protocol data unit session of the user equipment, a notification is transmitted, by the user equipment, to the core network of the telecommunications network, the user equipment route selection policy information is modified.

However, additionally according to the present invention, it is furthermore advantageously possible to also overcome the limitations associated with the conventionally known use of user equipment route selection policy information via not only taking into account a considered data packet more or less in an isolated manner, but by considering a data stream (A, B, C), i.e. a stream of data packets (meaning more than one data packet). Such a data stream or stream of data packets also has properties (e.g. its history or data volume or bandwidth requirements) that relate to the data stream, and, hence, not to the data packets individually. According to the present invention, it is advantageously also possible that, based on or in dependency of the content of the at least one modification and/or handling indication 410, one or more actions is/are performed based on a property (or properties) of a considered data stream, i.e. according to the present invention the user equipment route selection policy information 400 comprises at least one modification and/or handling indication 410 such that regarding a considered data packet (as part of a considered data stream or a considered stream of data packets) to be handled or treated by the user equipment route selection policy functionality 21, the considered data packet (after having been received by the user equipment route selection policy functionality 21 as part of the considered data stream or the considered stream of data packets) handled based on or in dependency of the content of the at least one modification and/or handling indication 410 according to one or more of the following actions:

the considered data packet is treated such as to be dropped or buffered, the considered data packet is modified and treated such as to be assigned or fed to a specific protocol data unit session of the user equipment, the considered data packet is treated such as to be assigned or fed to a further specific protocol data unit session of the user equipment, different from a protocol data unit session used with regard to the preceding data packet of the considered data stream or the considered stream of data packets, a notification is transmitted, by the user equipment, to the core network of the telecommunications network, the user equipment route selection policy information is modified.

Hence, according to such an embodiment of the present invention, instead of considering only one data packet (i.e. 'the considered data packet'), a data stream or stream of data packets is considered, i.e. at least two data packets, and the user equipment route selection policy information 400 comprises the at least one modification and/or handling indication 410 such that, regarding a considered preceding data packet—the considered data packet and the considered preceding data packet especially belonging to a data stream or to the same data stream (or stream of data packets), and the considered preceding data packet precedes the considered data packet-, the method comprises a third step prior to the first step, wherein, in the third step, the considered preceding data packet is received by the user equipment route selection policy functionality 21 and, based on or in dependency of the content of the at least one modification and/or handling indication 410, the considered preceding data packet is treated such as to be assigned or fed to a specific protocol data unit session of the user equipment.

Hence, according to such an embodiment of the present invention, the data stream (or stream of data packets) considered has, up to the considered preceding data packet, properties such that a specific trigger condition is not yet fulfilled or verified (and, hence, typically the data packets of such data stream are assigned or fed to a specific protocol data unit session (e.g. 501), or 'normal' protocol data unit session), whereas such trigger condition is fulfilled or verified upon reception, at the user equipment route selection policy functionality 21, or upon treatment of the considered data packet (subsequent to the considered preceding data packet), resulting in performing one or a plurality of the mentioned actions (including dropping or buffering or modifying the considered data packet, or transmitting a notification or modifying the user equipment route selection policy information).

In this respect, it is especially preferred according to the present invention, that the considered data packet is treated-alternatively or cumulatively to one or more of the actions of or defined in the second step-such as to be assigned or fed to a further specific protocol data unit session (e.g. 502) of the user equipment 20, different from the specific (or 'normal') protocol data unit session (i.e. the specific protocol data unit session being the normal (or default or prescribed) protocol data unit session for the data packets of the considered data stream).

According to a preferred embodiment of the present invention, the modification and/or handling indication 410 comprises or corresponds to a bandwidth limit indication or the user equipment route selection policy information 400 comprises a bandwidth limit indication (especially as the modification and/or handling indication 410). It is thereby advantageously possible to be able to set a bandwidth limit via using user equipment route selection policy information 400.

The bandwidth limit indication either as part of the modification and/or handling indication 410 (which is itself part of the user equipment route selection policy information 400 or the considered user equipment route selection policy rule 400) or being or corresponding to the modification and/or handling indication 410 (being part of the user equipment route selection policy information 400) is especially part of the route selection descriptors or of the route selection components of the user equipment route selection policy information 400 (or user equipment route selection policy rule 400). Using a bandwidth limit indication as part of the user equipment route selection policy information 400 results in the following behavior of the user equipment 20: once the bandwidth limit is reached, traffic (transmitted by the user equipment 20) is throttled, i.e. especially the bandwidth limit is reached with or subsequent to the considered preceding data packet, resulting in subsequent traffic, especially the considered data packet, being throttled, especially via the considered data packet being dropped or buffered or assigned or fed to the further specific protocol data unit session (especially having a lower quality-of-service level) instead of the specific protocol data unit session.

Especially, notification towards the (core) network 120 and/or an application is provided that the given rule has been triggered (e.g. allows the application to judge whether to reduce traffic or use another protocol data unit session). Furthermore, it is possible and preferred according to the present invention that the bandwidth limit indication indicates what to do with the traffic (e.g. buffering, drop, reference to a given route selection identifier), i.e. the bandwidth limit indication especially comprises an indication such that the handling of excess traffic is able to be defined, especially via buffering such excess traffic and/or dropping such excess traffic and/or applying a predefined user equipment route selection policy rule to such excess traffic.

Especially, this embodiment allows user equipment route selection policy rules 400 to incorporate traffic shaping functionality in the user equipment 20, thus freeing the core network 120 of this functionality in the uplink direction, especially enabling, e.g., bandwidth limitation schemes such as: maximum bit rate (MBR), guaranteed bit rate (GBR) or packet rate enforcement, i.e. shaping of the bit rate of matching traffic.

Especially, the bandwidth limit indication thus acts as a QER, QOS (quality-of-service) Enforcement Rule.

Especially, dropping excess traffic is performed via the bandwidth limit indication comprising a traffic sink indication as part of the route selection descriptors or as part of the route selection components of the user equipment route selection policy information 400, wherein especially reaching the bandwidth limit with or subsequent to the considered preceding data packet, results in a notification or message being transmitted, by the user equipment 20, towards the core network 120 and/or to an application server entity.

Figure 4:
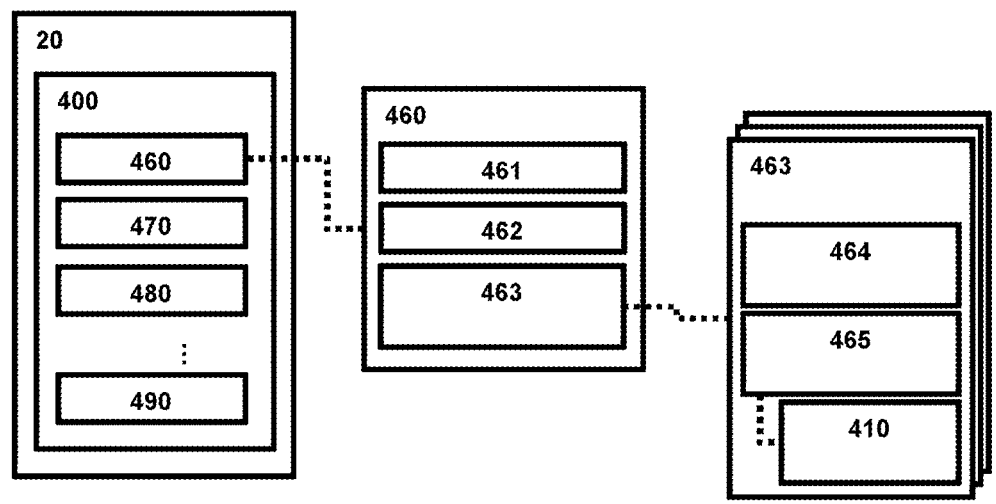
FIGS. 4 and 5 schematically illustrate embodiments of the use of a bandwidth limit indication as part of a user equipment route selection policy rule or as part of the user equipment route selection policy information.
Figure 5:
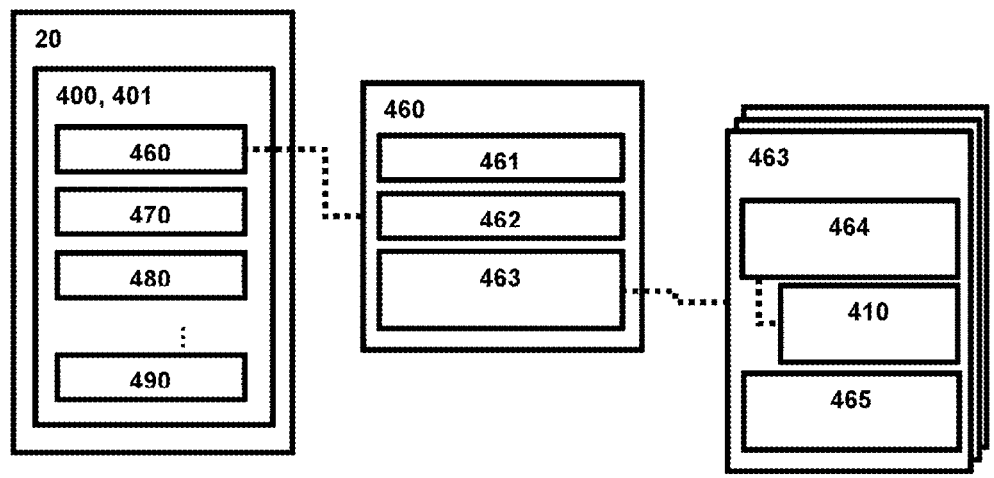

Exemplary embodiments of the use of a bandwidth limit indication are schematically represented in FIGS. 4 and 5, these figures schematically showing the bandwidth limit indication as part of a user equipment route selection policy rule 400 or as part of the user equipment route selection policy information 400 according to different variants. According to the present invention, the user equipment route selection policy information 400, i.e. especially its structure, is defined in a manner different to its currently known definition in the current version of 3GPP TS 23.503, as it comprises, according to the present invention, the modification and/or handling indication 410, wherein the modification and/or handling indication 410 either comprises the bandwidth limit indication or it corresponds to the bandwidth limit indication (i.e. in this latter case the bandwidth indication and the modification and/or handling indication 410 are able to be used synonymously). FIGS. 4 and 5 schematically show different embodiments of the structure of a user equipment route selection policy information 400 according to the present invention, wherein the exemplary representation of FIGS. 4 and 5 shows the user equipment route selection policy information 400 to comprise a plurality of (individual) user equipment route selection policy rules 460, 470, 480, 490 (i.e. a first user equipment route selection policy rule 460, a second user equipment route selection policy rule 470, a third user equipment route selection policy rule 480, and a fifth user equipment route selection policy rule 490), and wherein, for the sake of simplicity, the structure of only one of these rules (namely user equipment route selection policy rule 460 or first user equipment route selection policy rule 460) is schematically shown; however, it is understood that the other user equipment route selection policy rules 470, 480, 490 are able to be similarly structured.

According to one preferred embodiment of the present invention, shown in FIGS. 4 and 5, the modification and/or handling indication 410 (either comprising the bandwidth limit indication or corresponding to the bandwidth indication) of the user equipment route selection policy rule 460 (comprising the precedence value 461, the traffic descriptor 462 and at least one route selection descriptor (list) 463) is a part of at least one route selection descriptor (list) 463, i.e. the user equipment route selection policy rule 460 comprises the modification and/or handling indication 410 as part of the at least one route selection descriptor (list) 463, and either as part of the route selection validation criteria 465 (and besides the route selection components 464)—cf. FIG. 4—or as part of the route selection components 464 (and besides the route selection validation criteria 465)—cf. FIG. 5. Especially, FIGS. 4 and 5 represent the case that the modification and/or handling indication 410 is or corresponds to the bandwidth limit indication, especially as a quality-of-service enforcement rule (or quality-of-service enforcement component), i.e. in this case reference sign 410 refers to the bandwidth limit indication, especially in the form of quality-of-service enforcement rule.

In FIGS. 4 and 5, examples are shown how the bandwidth limit indication-either as a part of the modification and/or handling indication or corresponding to the modification and/or handling indication—is able to be integrated into the structure of a user equipment route selection policy rule. According to the present invention, it is especially preferred that, alternatively or cumulatively to the bandwidth limit indication, the header modification indication and/or the traffic encryption indication and/or the notification indication and/or the rule modification indication is able to be integrated-likewise either as a part of the modification and/or handling indication or corresponding to the modification and/or handling indication—into the structure of a user equipment route selection policy rule in the same manner, i.e. as part of the at least one route selection descriptor (list) 463, and either as part of the route selection validation criteria 465 (and besides the route selection components 464)—cf. FIG. 4—or as part of the route selection components 464 (and besides the route selection validation criteria 465)—cf. FIG. 5.

According to the present invention, the user equipment route selection policy information 400 might comprise either one user equipment route selection policy rule 460 or a plurality of user equipment route selection policy rules 460, 470, 480, 490. In any case, according to the present invention, the modification and/or handling indication 410 is preferably part of the one (i.e. only) user equipment route selection policy rule 460 (of the user equipment route selection policy information 400) or, in case of a plurality of user equipment route selection policy rules 460, 470, 480, 490 present (in or as part of the user equipment route selection policy information 400), the modification and/or handling indication 410 is part of one of these user equipment route selection policy rules 460, 470, 480, 490; alternatively, the modification and/or handling indication 410 is part of more than one of these user equipment route selection policy rules 460, 470, 480, 490. Besides the modification and/or handling indication 410, the structure of the user equipment route selection policy information 400 corresponds to the definition as in the current version of 3GPP TS 23.503, i.e. it is or corresponds to a set of one or more URSP rules 460, 470, 480, 490, where the or each user equipment route selection policy rule 460, 470, 480, 490 generally comprises the three parts of a precedence value, a traffic descriptor, and one or more route selection descriptors.

As the user equipment route selection policy information 400 might comprise only one user equipment route selection policy rule, throughout this specification both terms (user equipment route selection policy information and user equipment route selection policy rule) are also synonymously referred to via reference sign 400.

Figure 6:
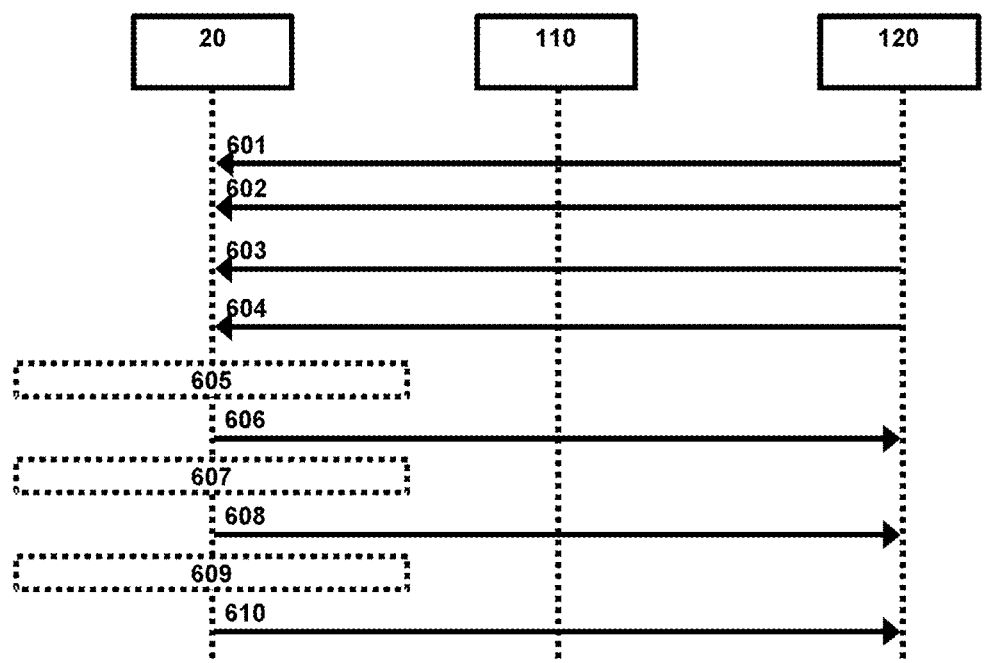
FIG. 6 schematically illustrates a communication diagram regarding a notification logic regarding what to do with excess traffic.

Regardless of the case, according to the present invention, the user equipment route selection policy information 400, or user equipment route selection policy rule 400, especially in case it comprises a bandwidth limit indication (a modification and/or handling indication or as the modification and/or handling indication 410), advantageously specifies what to do with (or in case of) "excess traffic", e.g. to buffer traffic and/or to drop traffic and/or to apply a given user equipment route selection policy rule and/or whether the user equipment 20 should notify the core network 120 once excess traffic is present, as well as what happened to this traffic. In FIG. 6, an example of such a notification logic (as a communication diagram between the user equipment 20 and the core network 120 (without interference of the access network 110) is schematically shown: In a first processing step 601, a user equipment route selection policy rule #1 is set (via a corresponding message transmitted by the core network 120 to the user equipment 20). In a second processing step 602, a user equipment route selection policy rule #2 is set (via a corresponding message transmitted by the core network 120 to the user equipment 20), comprising a quality-of-service enforcement rule QER (an example of a bandwidth limit indication as a modification and/or handling indication 410) to apply user equipment route selection policy rule #1 to excess traffic. In a third processing step 603, a user equipment route selection policy rule #3 is set (via a corresponding message transmitted by the core network 120 to the user equipment 20), comprising a quality-of-service enforcement rule QER (an example of a bandwidth limit indication as a modification and/or handling indication 410) to buffer excess traffic. In a fourth processing step 604, a user equipment route selection policy rule #4 is set (via a corresponding message transmitted by the core network 120 to the user equipment 20), comprising a quality-of-service enforcement rule QER (an example of a bandwidth limit indication as a modification and/or handling indication 410) to drop excess traffic. In a fifth processing step 605, the user equipment 20 detects or determines excess traffic for user equipment route selection policy rule #2, and in a sixth processing step 606 notifies (to the core network 120) of the application of user equipment route selection policy rule #1 to excess traffic from user equipment route selection policy rule #2. In a seventh processing step 607, the user equipment 20 detects or determines excess traffic for user equipment route selection policy rule #3, and in an eighth processing step 608 notifies (to the core network 120) of buffering of excess traffic from user equipment route selection policy rule #3. In a ninth processing step 609, the user equipment 20 detects or determines excess traffic for user equipment route selection policy rule #4, and in a tenth processing step 610 notifies (to the core network 120) of dropping of excess traffic from user equipment route selection policy rule #4.

In case that the bandwidth limit indication indicates to drop traffic, the corresponding user equipment route selection policy rule 400 especially comprises a corresponding indication in the route selection description list, i.e. a definition of the destination of dropped traffic is especially added to the route selection descriptors, e.g. in the form of a "/dev/null destination" indication for traffic matching the user equipment route selection policy rule or exceeding traffic matching this user equipment route selection policy rule; in addition, a notification is generated and transmitted towards the core network 120 and/or to the application that the given rule has been triggered (e.g. allows the application to judge whether to reduce traffic or use another protocol data unit session). Alternatively or cumulatively, a periodic or network-triggered reporting (in the form of a notification) of the amount of dropped traffic is also possible and preferred according to the present invention. Hence, the simple addition to the user equipment route selection policy rules allows to implement a traffic drop functionality in the user equipment 20 via using user equipment route selection policy rules (user equipment route selection policy information) 400, preferably via the addition of a traffic sink as destination in route selection component(s).

According to a preferred embodiment of the present invention, the modification and/or handling indication 410 comprises or corresponds to a header modification indication or the user equipment route selection policy information 400 comprises a header modification indication (especially as the modification and/or handling indication 410). It is thereby advantageously possible to be able to apply a change on or to the (data) packets being routed via the considered user equipment route selection policy rule 400, e.g. it is possible to change DSCP, differentiated services codepoint value). Especially, the header modification indication comprises pieces of information regarding one or a plurality of the following: header identifier, name, position and/or variable type (string, int, . . . ) and/or the value to use. The header modification indication either as part of the modification and/or handling indication 410 (which is itself part of the user equipment route selection policy information 400 or the considered user equipment route selection policy rule 400) or being or corresponding to the modification and/or handling indication 410 (being part of the user equipment route selection policy information 400) is especially part of the route selection descriptors or of the route selection components of the user equipment route selection policy information 400 (or user equipment route selection policy rule 400).

According to a preferred embodiment of the present invention, the modification and/or handling indication 410 comprises or corresponds to a traffic encryption indication or the user equipment route selection policy information 400 comprises a traffic encryption indication (especially as the modification and/or handling indication 410). It is thereby advantageously possible to provide traffic encryption based on user equipment route selection policy rules or user equipment route selection policy information 400. In conventionally known telecommunications networks, user equipment route selection policy rules are steered from the policy and charging function (as part of the core network 120), specifically the H-PCF (i.e. the home policy and charging function, or the policy and charging function of the home network) in the roaming case. As such, it is known to the core network 120 (or home core network, H-CN) which user equipment route selection policy information 400 or user equipment route selection policy rules 400 are placed in the user equipment 20. Via encrypting traffic or data packets via the user equipment route selection policy rules or information, it is thus possible to steer from the home operator so that the following is able to be realized:

traffic is not visible by the access network,
traffic is not visible by the V-PLMN's (visited telecommunications network's) core network.

Figure 7:
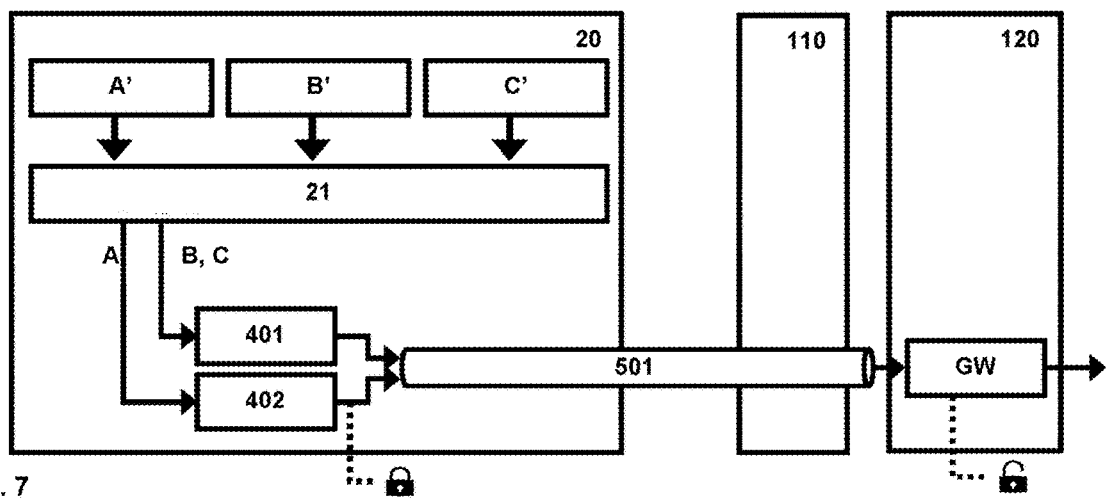
FIGS. 7 and 8 schematically illustrate different embodiments using a traffic encryption indication as or as part of the modification and/or handling indication.
Figure 8:
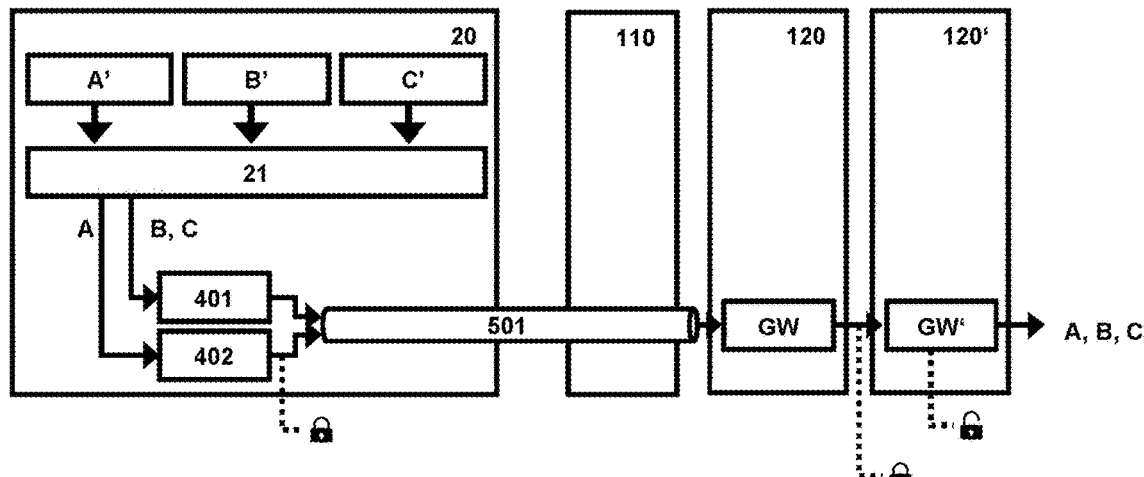

This is schematically shown in FIGS. 7 and 8, showing different embodiments using a traffic encryption indication as or as part of the modification and/or handling indication 410: In FIG. 7, the user equipment 20 is shown to exemplarily transmit three data streams A, B, C (e.g. emanating or being generated by three applications A', B', C'). These data streams A, B, C are provided to the user equipment route selection policy functionality 21 of the user equipment 20, where data stream A is provided to or handled by a second user equipment route selection policy rule 402, whereas data streams B and C are provided to or handled by a first user equipment route selection policy rule 401 (e.g. "regarding traffic A, user equipment route selection policy rule 401 (with encryption) shall be set, whereas traffic B and C shall use default user equipment route selection policy rule 402"). FIG. 7 exemplarily shows the case of the second user equipment route selection policy rule 402 comprising a traffic encryption indication as or as part of the modification and/or handling indication 410, resulting in data stream A (i.e. the data packets of data stream A) being (at least partly or completely) encrypted (e.g. regarding their payload part (i.e. especially excluding their header part) or regarding at least a part of their payload part), and especially marked such that the receiving gateway GW is able to filter and decrypt. In the exemplary embodiment shown in FIG. 7, the data packets of data stream A as well as the data packets of data streams B and C are transported (or transmitted)—from the user equipment 20 to the core network 120 (in this case the core network 120 corresponds to the core network of the home network of the user equipment 20), or, rather, a gateway GW of the core network 120 such as its user plane function—using the same protocol data unit session (represented, in FIG. 7, as protocol data unit session 501). As the user equipment 20—instructed or prescribed by the second user equipment route selection policy 402, and especially the traffic encryption indication thereof—encrypts data stream A which is only (able to be) decrypted by the gateway GW of the core network 120, the (encrypted) content of data stream A is not accessible to (or not able to be accessed by) the access network 110 (even if such an access would be attempted).

For the roaming case, where traffic is routed by a V-PLMN towards the H-PLMN, it is advantageous to perform the decryption at the H-PLMN, thus obscuring the traffic from the V-PLMN. This is schematically shown in FIG. 8, which again shows the user equipment 20 to exemplarily transmit three data streams A, B, C (e.g. emanating or being generated by three applications A', B', C'). These data streams A, B, C are again provided to the user equipment route selection policy functionality 21 of the user equipment 20, where data stream A is provided to or handled by a second user equipment route selection policy rule 402, whereas data streams B and C are provided to or handled by a first user equipment route selection policy rule 401 (e.g. "regarding traffic A, user equipment route selection policy rule 401 (with encryption) shall be set, whereas traffic B and C shall use default user equipment route selection policy rule 402"). FIG. 8 exemplarily shows the case of the second user equipment route selection policy rule 402 comprising a traffic encryption indication as or as part of the modification and/or handling indication 410, resulting in data stream A (i.e. the data packets of data stream A) being (at least partly or completely) encrypted, and especially marked such that the receiving gateway GW in the home telecommunications network of the user equipment 20 is able to filter and decrypt. In the exemplary embodiment shown in FIG. 8, the data packets of data stream A as well as the data packets of data streams B and C are again transported (or transmitted) using the same protocol data unit session (represented, in FIG. 8, as protocol data unit session 501). In contrast to the representation in FIG. 7 however, the user equipment 20 is connected to the access network 110 of the visited network 100, hence, the protocol data unit session 501 ends at the corresponding gateway GW of the core network 120 of the visited telecommunications network 100. However, the encrypted data (of data stream A) are not accessible to the core network 120 of the visited telecommunications network 100 as these data still remain encrypted until transmitted to the core network 120' of the home network 100' of the user equipment 20 (in this considered roaming case); only the gateway GW' of the core network 120' of the home network 100' is able to decrypt the encrypted data of data stream A.

As the user equipment 20—instructed or prescribed by the second user equipment route selection policy 402, and especially the traffic encryption indication thereof—encrypts data stream A which is only (able to be) decrypted by the gateway GW' of the core network 120' of the home network 100', the (encrypted) content of data stream A is not accessible to (or not able to be accessed by) the access network 110 of the visited network 100 and neither to the core network 120 of the visited network 100 (even if such an access would be attempted).

Especially according to the present invention, the traffic encryption indication comprises encryption parameters that are:

provided by the telecommunications network 100 (especially in case it is the home network) or
provided by another telecommunications network (especially network 100' being the home network of the user equipment 20) or
provided by a third party (especially an application provider or an application server entity).

In case that the encryption parameters are provided by the third party, it is especially preferred according to the present invention that only the third party is able to decrypt the encrypted data (analogously to the description relating to FIGS. 7 and 8), i.e. the encrypted data especially remain encrypted through the visited telecommunications network and the home telecommunications network, and are only decrypted by the application provider or third party.

According to a further preferred embodiment of the present invention, the modification and/or handling indication 410 comprises or corresponds to a processing logic indication or the user equipment route selection policy information 400 comprises a processing logic indication (especially as the modification and/or handling indication 410). It is thereby advantageously possible to provide the possibility to apply processing logic based on user equipment route selection policy rules or user equipment route selection policy information 400, especially in the route selection description list:

According to this embodiment of the present invention, instead of using (rather static) user equipment route selection policy parameters (as part of the user equipment route selection policy rules 400), user equipment route selection policy rules are additionally or alternatively allowed to contain program elements that, from the point of view of the corresponding user equipment route selection policy rule, are "black boxes". Such program elements are especially traffic manipulation instructions describing the processing of the traffic (i.e. "source code" where the actual instructions are visible). Alternatively (or cumulatively) such program elements are especially machine-readable program (parts), interfacing with input-output of an user equipment route selection policy engine and/or of the user equipment route selection policy functionality 21 (i.e. "compiled code" where the instructions themselves are not visible).

According to this embodiment, it is typically required to provide a runtime for packet processing to allow platform-agnostic code to run (e.g. a JVM, P4 compiler and executor or the like). Especially, a local repository at the user equipment 20 is provided in order to store processing logic so that it can be referenced in the user equipment route selection policy setup; this avoids sending or transmitting the whole code (information) each time. Furthermore, it is especially provided to reference packet processing logic in user equipment route selection policy rules 400 (instead of having the code itself within the user equipment route selection policy rules), e.g. realized via a "container repository" from where such logic is able to be retrieved.

This is contrast to the conventionally known use of user equipment route selection policy information that only contains parameters for a fixed set of traffic descriptor, route selection descriptor, etc.; thus, the available degrees of freedom are limited.

Furthermore, the packet processing logic is visible to the user equipment 20—hence, according to an embodiment using at least one processing logic indication, it is advantageously possible according to the present invention that the network is able to deploy user equipment route selection policy rules including packet processing applications.

Typically, this requires a user equipment route selection policy runtime, which especially includes:

an interface where input packets matching the traffic description criteria is input to a matching user equipment route selection policy program;
an interface where a user equipment route selection policy program outputs data packets back to the user equipment route selection policy runtime;
optionally, one or more interfaces where user equipment route selection policy programs can exchange data (especially one or a plurality out of the following: capabilities of the URSP runtime, subscriber information within the user equipment, location, available access technologies, communication with the access network and/or core network via the user equipment route selection policy runtime or via other user equipment components (e.g. a DNS client) in order to, e.g., retrieve network and/or radio load, query subscription data within the network, and/or request triggering of network logic (e.g. setting of additional user equipment route selection policy rules, activation of specific features/quality-of-service)) via the user equipment route selection policy runtime with the user equipment route selection policy runtime and/or other user equipment components.

In short, the use of at least one processing logic indication allows the network to deploy similar packet processing logic as would be deployed in the packet gateway, thus achieving offloading of packet processing in the uplink and thus reducing stress on the network side. Especially, the user equipment route selection policy programs are preferably able to contain proprietary (e.g. operator-specific) rule implementations.

According the present invention, the provision of the corresponding user equipment route selection policy information, comprising at least one processing logic indication, is especially realized as follows: The core network sets a user equipment route selection policy rule including a user equipment route selection policy program reference (i.e. the at least one processing logic indication either comprises the user equipment route selection policy program or refers to such a program); in case that only a reference to the user equipment route selection policy program is provided as part of the processing logic indication (i.e. as part of the user equipment route selection policy rule), the user equipment 20 retrieves the user equipment route selection policy program information from a user equipment route selection policy program repository entity or functionality, using the reference information of the user equipment route selection policy rule/processing logic indication: The user equipment 20 then contains or comprises the complete user equipment route selection policy information, i.e. including the user equipment route selection policy program. Especially, the user equipment 20 is able to subscriber (especially at the user equipment route selection policy program repository) to changes to the respective user equipment route selection policy program; it then gets a notification (likewise especially from the user equipment route selection policy program repository) in case of changes or modifications or deletions regarding the respective user equipment route selection policy program or in case of other relevant changes.

Especially according to the present invention, user equipment route selection policy programs are able to make use of the capabilities of the user equipment route selection policy runtime, namely at least regarding one or a plurality out of the following:

data packet manipulation,
variables and boolean logic,
interfacing with user equipment route selection policy runtime and indirectly with other components within the user equipment 20 and/or in the access network and/or the core network and/or with third party components beyond the core network, either directly or via a intermediate gateway (e.g. a network exposure function in the case of 5G).

This especially allows for an arbitrary logic to be implemented within (or triggered or prescribed by) user equipment route selection policy rules as long as such is supported by the user equipment route selection policy runtime; it allows network operators to deploy customer-specific and/or proprietary data processing on the user equipment via user equipment route selection policy rules or user equipment route selection policy information. Auch user equipment route selection policy programs are considered to be part of user equipment route selection policy rules sent to the user equipment 20 by the core network. This enables an efficient use of user equipment route selection policy programs so that they need only be instantiated when certain criteria are met.

Additional aspects relate to the setup of a "catch-all" traffic descriptor resulting in the user equipment route selection policy (i.e. user equipment route selection policy program) being applied to all traffic and/or to the inclusion not of the user equipment route selection policy program itself in the user equipment route selection policy sent from the core network but rather a reference pointing to the user equipment route selection policy repository where the user equipment route selection policy program can be retrieved.

According to a further preferred embodiment of the present invention, the modification and/or handling indication 410 comprises or corresponds to a notification indication or the user equipment route selection policy information 400 comprises a notification indication (especially as the modification and/or handling indication 410). It is thereby advantageously possible to generate notifications based on the user equipment route selection policy usage, especially that interfacing application owners are able to setup user equipment route selection policy rules in the user equipment 20 and the capability of generating notifications based on the user equipment route selection policy usage.

According to still a further preferred embodiment of the present invention, the modification and/or handling indication 410 comprises or corresponds to a rule modification indication or the user equipment route selection policy information 400 comprises a rule modification indication (especially as the modification and/or handling indication 410). It is thereby advantageously possible to change the validity status of a user equipment route selection policy rule (or it is possible to remove the user equipment route selection policy rule) by the trigger event, e.g. in case that a data cap is reached.

Figure 9:
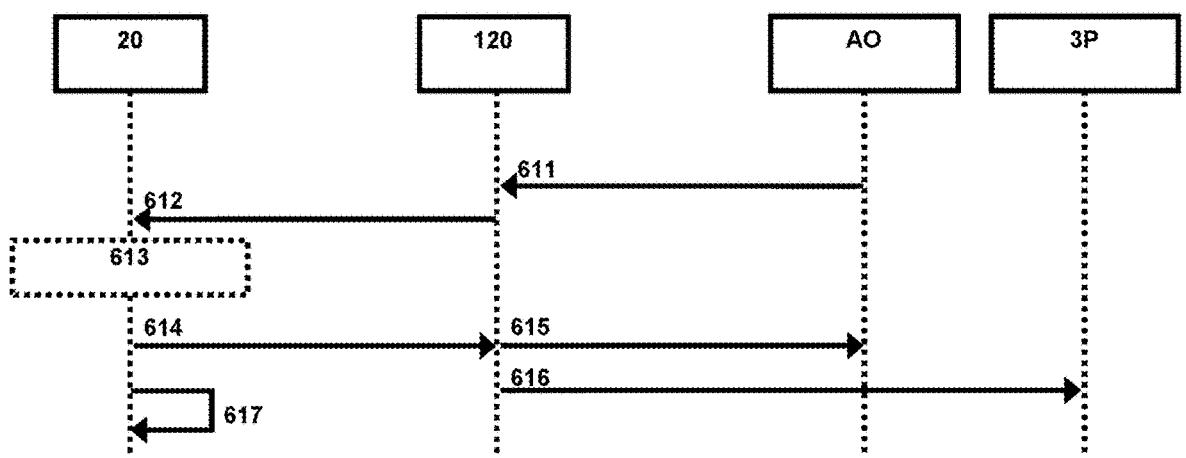
FIG. 9 schematically illustrates an embodiment of a communication diagram relating to the use of traffic-related triggers resulting in notifications and/or the modification of user equipment route selection policy rules.

The general use case is the setup of a user equipment route selection policy rule by the core network or an external application owner (typically via a core network exposure function, e.g. network exposure function in 5G) setting up a user equipment route selection policy rule with a conditional, data-triggered condition, especially in contrast to purely time-based and/or location-based user equipment route selection policy conditions. This is especially shown in FIG. 9, representing an embodiment of a communication diagram relating to the use of traffic-related triggers resulting in notifications and/or the modification of user equipment route selection policy rules. FIG. 9 shows a communication diagram between the user equipment 20, the core network 120, an application owner AO, and a third party 3P. In a first processing step 611, the AO sets (via transmitting a corresponding message to the core network 120) a user equipment route selection policy rule including a traffic-related trigger condition, and indicating the notification endpoint. In a second processing step 612, the core network 120 sets the user equipment route selection policy trigger rule at (or to) the user equipment 20 (via a message towards the user equipment 20); this results in the trigger condition be monitored (via including it in the respective user equipment route selection policy rule) by the user equipment 20. In a third processing step 613, the trigger condition is verified, i.e. the trigger is set at the user equipment 20, resulting, in a fourth processing step 614, in a user equipment route selection policy notification from the user equipment 20 to the core network 120. In turn, this results in a notification, by the core network 120 to the AO (in a fifth processing step 615), and to a notification to the third party 3P (in a sixth processing step 616). In an optional seventh processing step 617, the user equipment route selection policy rule is modified (e.g. deleted or invalidated or inactivated).

Hence, it is advantageously possible according to the present invention that the interfacing of application owners to setup user equipment route selection policy rules in the user equipment 20 and the capability of generating notifications is based on the usage or user equipment route selection policy rules.

Especially, these notifications, but generally all user equipment route selection policy rule-triggered notifications according to the present invention (i.e. notifications being triggered by or based of a specific user equipment route selection policy rule based on its modification and/or handling indication, especially in case the modification and/or handling indication is, corresponds to or comprises at least one of a bandwidth limit indication, header modification indication, a traffic encryption indication, a notification indication, and a rule modification indication) at least comprise a reference information to the generating specific user equipment route selection policy rule and/or a reference information to the generating modification and/or handling indication, and a trigger event information indicating or relating to the trigger event or to the trigger condition triggering the generation of the notification.

Via using at least one notification indication and/or at least one rule modification indication as part of the modification and/or handling indication, it is advantageously possible, according to the present invention, that reporting capabilities are added to user equipment route selection policy rules. Hence, user equipment route selection policy rules are set to contain additional trigger(s) stating, e.g.

- the condition on which the notification trigger activates, e.g. a certain amount of data has been routed by the user equipment route selection policy rule (absolute value or since last triggering) and/or the user equipment route selection policy rule has been used;
- the type of triggering, e.g. a one time trigger (only once), or every time the condition is met, or periodically, i.e. periodically if the condition has been met since last time;
- data to be contained in the trigger, e.g. the current amount of data transmitted in total or since the last triggering and/or a user equipment route selection policy description or identifier univocally identifying the user equipment route selection policy rule (at least within the user equipment 20).

A possible use case of this functionality is that of creating charging data records (CDRs); such a CDR corresponds to a notification triggered by an event: Both that such a notification itself is a CDR or that the notification itself is converted into a CDR, e.g. by the core network 120.

It is furthermore preferred according to the present invention that a user equipment route selection policy rule usage-related notification triggers logic within the core network to, e.g., set or modify or remove user equipment route selection policy rules within the user equipment 20 and/or to steer session logic (e.g. protocol data unit session termination, session modification) and/or a notification of third party entities via, e.g., network exposure function (NEF) regarding the individual user equipment's notification or of an aggregated number of user equipments.

In conventionally known telecommunications networks, such triggers are not available based on the usage of a given user equipment route selection policy rule, e.g., notifications towards other network components based on said rules; neither access traffic steering, switching and splitting (ATSSS)-based nor user equipment route selection policy-based methods enable notifications based on traffic rules (i.e. traffic filter-triggered).

Furthermore according to the present invention, via using at least one notification indication and/or at least one rule modification indication as part of the modification and/or handling indication, it is advantageously possible to set, e.g., a maximum data limit for a user equipment route selection policy rule, i.e. an additional option for the trigger (or a trigger condition) is that the validity status of the user equipment route selection policy rule is changed by the trigger event (or the removal of said user equipment route selection policy rule is triggered); a typical example is that a given data cap is reached: in this case, once the data limit is reached, the rule is not valid anymore (e.g. traffic then uses another "default traffic rule"). The user equipment 20 monitors how much traffic matched the rule and keeps track of when the transferred data equals or surpassed the specified value. Once said limit is reached the user equipment route selection policy rule is not valid anymore.

This especially enables notifications towards the network and/or application that the given rule has been triggered (e.g. allows the application to judge whether to apply specific logic such as stopping latency-sensitive logic; lets the network trigger operator logic such as notifying the subscriber that the data cap has been exhausted) and/or provides an indication what to do with the traffic (e.g. buffering, drop, reference to a given route selection identifier).

Hence, this allows user equipment route selection policy rules to lose validity once a certain amount of traffic has been routed via, or using, such user equipment route selection policy rules.

Especially according to the present invention, several positions are possible for containing the data cap constraining the validity of the rule; furthermore, a counter keeping track of the current rule usage and the action to be taken after reaching the set amount is possible to be implemented.

Once the data traffic routed by the user equipment route selection policy rule triggers the event, the following actions are possible and preferred:

- in case of excess traffic: a traffic descriptor is specified implementing one of following options: buffer traffic, drop traffic, apply another user equipment route selection policy rule, i.e. applying user equipment route selection policy rule chaining,
- remove the user equipment route selection policy rule from the user equipment route selection policy list,
- mark the user equipment route selection policy rule as not valid without deleting it.

Throughout this specification, it has repeatedly been said, that the modification and/or handling indication 410 comprises or is or corresponds to a bandwidth limit indication or a header modification indication or a traffic encryption indication or a notification indication or a rule modification indication. This is to be understood that the term modification and/or handling indication might be replaced by one of the respective other terms in case the modification and/or handling notification is such an other notification, hence, e.g., in the specific case of the modification and/or handling notification being (or corresponding to) a notification indication, the user equipment route selection policy information 400 comprises at least one notification indication such that regarding a considered data packet to be handled or treated by the user equipment route selection policy functionality 21, the method comprises the steps of the user equipment route selection policy functionality receiving the considered data packet, and, based on or in dependency of the content of the at least one notification indication a notification is transmitted, by the user equipment 20, to the core network 120 of the telecommunications network 100. Of course, in the specific case of the modification and/or handling notification being (or corresponding to) the a header modification indication or a traffic encryption indication, the method would comprise the steps of the user equipment route selection policy functionality receiving the considered data packet, and, based on or in dependency of the content of the at least one header modification indication or the at least one traffic encryption indication the considered data packet is modified and treated such as to be assigned or fed to a specific protocol data unit session of the user equipment 20.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for applying user equipment route selection policy information when operating a user equipment connected to a telecommunications network, the telecommunications network comprising a core network,
wherein the user equipment applies the route selection policy information to user plane data being carried by data packets,
wherein the user equipment comprises a user equipment route selection policy functionality for applying the user equipment route selection policy information such that data packets carrying such user plane data are treated in accordance with the user equipment route selection policy information,
wherein the user equipment route selection policy information comprises at least one modification and/or handling indication such that, regarding a respective data packet to be treated by the user equipment route selection policy functionality, the method comprises the following steps:
in a first step, the respective data packet is received by the user equipment route selection policy functionality; and
in a second step and based on the content of the at least one modification and/or handling indication, one or more of the following actions is performed by the user equipment route selection policy functionality:
the respective data packet is treated as a data packet which is to be buffered,
the respective data packet is modified and treated as a data packet which is to be assigned to a specific protocol data unit session of the user equipment,
a notification is transmitted, by the user equipment, to the core network of the telecommunications network, or
the user equipment route selection policy information is modified;
wherein the user equipment route selection policy information comprises the at least one modification and/or handling indication such that, regarding a respective preceding data packet, the method further comprises a third step prior to the first step, wherein, in the third step, the respective preceding data packet is received by the user equipment route selection policy functionality and, based on the content of the at least one modification and/or handling indication, the respective preceding data packet is treated as a data packet which is to be assigned to a specific protocol data unit session of the user equipment.

2. The method according to claim 1, wherein the respective data packet is treated-cumulatively to one or more of the actions of the second step-as a data packet which is to be assigned to a further specific protocol data unit session of the user equipment, different from the specific protocol data unit session.

3. The method according to claim 1, wherein the modification and/or handling indication comprises or corresponds to a bandwidth limit indication or the user equipment route selection policy information comprises a bandwidth limit indication.

4. The method according to claim 1, wherein:
the modification and/or handling indication comprises or corresponds to a header modification indication, or
the user equipment route selection policy information comprises a header modification indication.

5. The method according to claim 1, wherein:
the modification and/or handling indication comprises or corresponds to a traffic encryption indication, or
the user equipment route selection policy information comprises a traffic encryption indication; and
wherein data packets to be transmitted by the user equipment are modified via encrypting, at least the payload or parts thereof, such data packets.

6. The method according to claim 1, wherein the modification and/or handling indication comprises or corresponds to a processing logic indication or the user equipment route selection policy information comprises a processing logic indication.

7. The method according to claim 1, wherein:
the modification and/or handling indication comprises or corresponds to a notification indication, or
the user equipment route selection policy information comprises a notification indication.

8. The method according to claim 1, wherein:
the modification and/or handling indication comprises or corresponds to a rule modification indication, or
the user equipment route selection policy information comprises a rule modification indication.

9. The method according to claim 1, wherein in case that a notification is transmitted by the user equipment as a result of applying a specific user equipment route selection policy rule, the notification at least comprises the following information:
reference information referencing the generating specific user equipment route selection policy rule and/or reference information referencing the generating modification and/or handling indication, and/or
trigger event information indicating or relating to a trigger event or to a trigger condition triggering the generation of the notification.

10. The method according to claim 1, wherein the user equipment route selection policy information comprises one or more route selection policy rules; and
wherein the respective data packet and the respective preceding data packet belong to a same data stream.

11. The method according to claim 3, wherein a bandwidth limit is reached with or subsequent to a respective preceding data packet, resulting in subsequent traffic being throttled;
wherein a bit rate associated with a data stream is able to be controlled to enforce or provide a maximum bit rate, a guaranteed bit rate, or a packet rate;
wherein the bandwidth limit indication comprises an indication such that the handling of excess traffic is able to be defined via buffering such excess traffic and/or applying a predefined user equipment route selection policy rule to such excess traffic; and
wherein reaching the bandwidth limit with or subsequent to the respective preceding data packet results in a notification or message being transmitted, by the user equipment, towards the core network and/or to an application server entity.

12. The method according to claim 4, wherein the header modification indication comprises a description of header parameters to change; and
wherein the header modification indication comprises value information and one or more of the following: a header identifier, a name, a position, or a type of a variable.

13. The method according to claim 5, wherein the traffic encryption indication comprises encryption parameters that are:
provided by the telecommunications network,
provided by another telecommunications network, or
provided by a third party.

14. The method according to claim 6, wherein the processing logic indication comprises program elements comprising logic code; and
wherein the logic code or the program elements comprise:
traffic manipulation instructions describing the processing of traffic as interpretable or compilable source code,
logic code metadata providing verifiable information regarding the origin of the logic code, and/or
a machine-readable program interfacing the processing input and/or output of the user equipment route selection policy functionality as compiled or executable code.

15. The method according to claim 7, wherein the user equipment route selection policy functionality comprises a key performance indicator monitoring functionality;
wherein the transmission, by the user equipment, of a notification is triggered in case that a key performance indicator threshold is detected to be reached or exceeded related to a specific key performance indicator; and
wherein the specific key performance indicator is or relates to the amount of data routed by the respective user equipment route selection policy rule and/or to a charging data record.

16. The method according to claim 8, wherein the user equipment route selection policy functionality comprises a key performance indicator monitoring functionality;
wherein the modification of a user equipment route selection policy rule to be applied is triggered in case that a key performance indicator threshold is detected to be reached or exceeded related to a specific key performance indicator;
wherein the specific key performance indicator is or relates to the amount of data routed by the respective user equipment route selection policy rule and/or to a charging data record; and
wherein the validity status of the corresponding user equipment route selection policy rule is changed based on the key performance indicator threshold being detected to be reached or exceeded.

17. A user equipment for applying user equipment route selection policy information when being operated with a telecommunications network comprising a core network,
wherein the user equipment is configured to apply the route selection policy information to user plane data being carried by data packets,
wherein the user equipment comprises a user equipment route selection policy functionality for applying the user equipment route selection policy information such that data packets carrying such user plane data are treated in accordance with the user equipment route selection policy information,
wherein the user equipment comprises:
a processor; and
a memory having processor-executable instructions stored thereon;
wherein the user equipment route selection policy information comprises at least one modification and/or handling indication such that, regarding a respective data packet to be treated by the user equipment route selection policy functionality, the processor is configured to execute the processor-executable instructions to facilitate performance of the following:
receiving, by the user equipment route selection policy functionality, the respective data packet; and
based on the content of the at least one modification and/or handling indication, performing, by the user equipment route selection policy functionality, one or more of the following actions:
the respective data packet is treated as a data packet which is to be buffered,
the respective data packet is modified and treated as a data packet which is to be assigned to a specific protocol data unit session of the user equipment,
a notification is transmitted, by the user equipment, to the core network of the telecommunications network, or
the user equipment route selection policy information is modified;

wherein the user equipment route selection policy information comprises the at least one modification and/or handling indication, such that regarding a respective preceding data packet, the processor is further configured to execute the processor-executable instructions to facilitate performance of the following: prior to the user equipment route selection policy functionality receiving the respective data packet, the respective preceding data packet is received by the user equipment route selection policy functionality and, based on the content of the at least one modification and/or handling indication, the respective preceding data packet is treated as a data packet which is to be assigned to a specific protocol data unit session of the user equipment.

18. A non-transitory computer-readable medium having processor-executable instructions stored thereon for applying user equipment route selection policy information when operating a user equipment connected to a telecommunications network, the telecommunications network comprising a core network,
    wherein the user equipment is configured to apply the route selection policy information to user plane data being carried by data packets,
    wherein the user equipment comprises a user equipment route selection policy functionality for applying the user equipment route selection policy information such that data packets carrying such user plane data are treated in accordance with the user equipment route selection policy information,
    wherein the user equipment route selection policy information comprises at least one modification and/or handling indication such that, regarding a respective data packet to be treated by the user equipment route selection policy functionality, the processor-executable instructions, when executed, facilitate performance of the following:
    receiving, by the user equipment route selection policy functionality, the respective data packet; and
    based on the content of the at least one modification and/or handling indication, performing, by the user equipment route selection policy functionality, one or more of the following actions:
        the respective data packet is treated as a data packet which is to be buffered,
        the respective data packet is modified and treated as a data packet which is to be assigned to a specific protocol data unit session of the user equipment,
        a notification is transmitted, by the user equipment, to the core network of the telecommunications network, or
        the user equipment route selection policy information is modified;
    wherein the user equipment route selection policy information comprises the at least one modification and/or handling indication such that, regarding a respective preceding data packet, the processor-executable instructions, when executed, further facilitate performance of the following: prior to the user equipment route selection policy functionality receiving the respective data packet, the respective preceding data packet is received by the user equipment route selection policy functionality and, based on the content of the at least one modification and/or handling indication, the respective preceding data packet is treated as a data packet which is to be assigned to a specific protocol data unit session of the user equipment.

\* \* \* \* \*